(12) United States Patent
Aarre

(10) Patent No.: US 9,213,117 B2
(45) Date of Patent: Dec. 15, 2015

(54) DIP SEISMIC ATTRIBUTES

(71) Applicant: Schlumberger Technology Corporation, Sugar Land, TX (US)

(72) Inventor: Victor Aarre, Stavanger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 375 days.

(21) Appl. No.: 13/733,088

(22) Filed: Jan. 2, 2013

(65) Prior Publication Data

US 2014/0185413 A1    Jul. 3, 2014

(51) Int. Cl.
G01V 1/30    (2006.01)
G01V 1/28    (2006.01)

(52) U.S. Cl.
CPC .............. *G01V 1/307* (2013.01); *G01V 1/301* (2013.01); *G01V 2210/63* (2013.01)

(58) Field of Classification Search
CPC .................................. G01V 1/28; G01V 1/30
USPC ...................................... 367/38, 53
See application file for complete search history.

(56) References Cited

U.S. PATENT DOCUMENTS

| | | | |
|---|---|---|---|
| 4,348,748 A * | 9/1982 | Clavier et al. | 367/25 |
| 4,829,487 A * | 5/1989 | Malloy | 367/38 |
| 5,319,554 A * | 6/1994 | Padhi | 367/38 |
| 5,724,309 A * | 3/1998 | Higgs et al. | 367/53 |
| 5,892,732 A | 4/1999 | Gersztenkorn | |
| 7,373,252 B2 | 5/2008 | Sherrill et al. | |
| 7,453,766 B1 | 11/2008 | Padgett | |
| 2007/0027629 A1 | 2/2007 | Hassan et al. | |
| 2011/0118985 A1 | 5/2011 | Aarre | |
| 2012/0320712 A1 | 12/2012 | Aqrawi et al. | |

FOREIGN PATENT DOCUMENTS

WO    2005/017564 A1    2/2005

OTHER PUBLICATIONS

International Search Report and Written Opinion of PCT Application Serial No. PCT/US2013/073209 dated Mar. 11, 2014, 13 pages.

\* cited by examiner

*Primary Examiner* — Ian J Lobo
(74) *Attorney, Agent, or Firm* — Colin L. Wier; Rodney Warfford; Alec McGinn

(57) ABSTRACT

A method can include receiving a request for a dip value for a location within a sub-surface volume; responsive to the request, locating complementary dip values for locations within the sub-surface volume where the location for the requested dip value lies within bounds defined by the locations for the complementary dips values; and interpolating a value for the requested dip value based on the complementary dip values. Various other apparatuses, systems, methods, etc., are also disclosed.

20 Claims, 14 Drawing Sheets

Seismic Data 710

Positive Dip Data 720

Uncertainty Data 730

Positive Dip Data 740
(Reconstructed from Negative Dip Data)

Difference Data 750
(Data 720 and Data 740)

RMS Derivative Data 760

Equations 930

$PosDip[T,k] \approx NegDip[T+1,kk]$ $PosDip[T,k] \approx NegDip[T+1,101]*w[k] + NegDip[T+1,100]*(1 - w[k])$ $w[k] = (k - 99.5)/(101.5 - 99.5)$ Conditions 950

$kk_0 - NegDip[T+1,kk_0] < k$ $kk_1 = kk_0 + 1$ $kk_1 - NegDip[T+1,kk_1] > k$

Path Attribute Data 1210

DIP SEISMIC ATTRIBUTES

BACKGROUND

Seismic interpretation is a process that may examine seismic data (e.g., with respect to location and time or depth) in an effort to identify subsurface structures (e.g., horizons, faults, geobodies, etc.). Structures may be, for example, stratigraphic formations indicative of hydrocarbon traps or flow channels. In the field of resource extraction, enhancements to seismic interpretation can increase accuracy of a model of a geologic environment, which, in turn, may improve seismic volume analysis for purposes of resource extraction. Various techniques described herein pertain to processing of seismic data, for example, for analysis of such data (e.g., for identifying structures in a geologic environment).

SUMMARY

A method can include receiving a request for a dip value for a location within a sub-surface volume; responsive to the request, locating complementary dip values for locations within the sub-surface volume where the location for the requested dip value lies within bounds defined by the locations for the complementary dips values; and interpolating a value for the requested dip value based on the complementary dip values. In such a method, where the requested dip value is a value for a positive dip, the complementary dip values may be for negative dips and, where the requested dip value is a value for a negative dip, the complementary dip values may be for positive dips. A system can include one or more processors, memory and instructions to instruct the system to, responsive to a request for a dip value for a location within a sub-surface volume, locate complimentary dip values for locations within the sub-surface volume where the location for the requested dip value lies within bounds defined by the locations for the complementary dips values and interpolate a value for the requested dip value based on the complementary dip values. Computer-readable storage media can include computer-executable instructions to instruct a computing system to receive estimated dip values determined using volumetric seismic data and a dip estimation technique, calculate interpolated dip values based on the received estimated dip values and render the interpolated dip values to a display. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
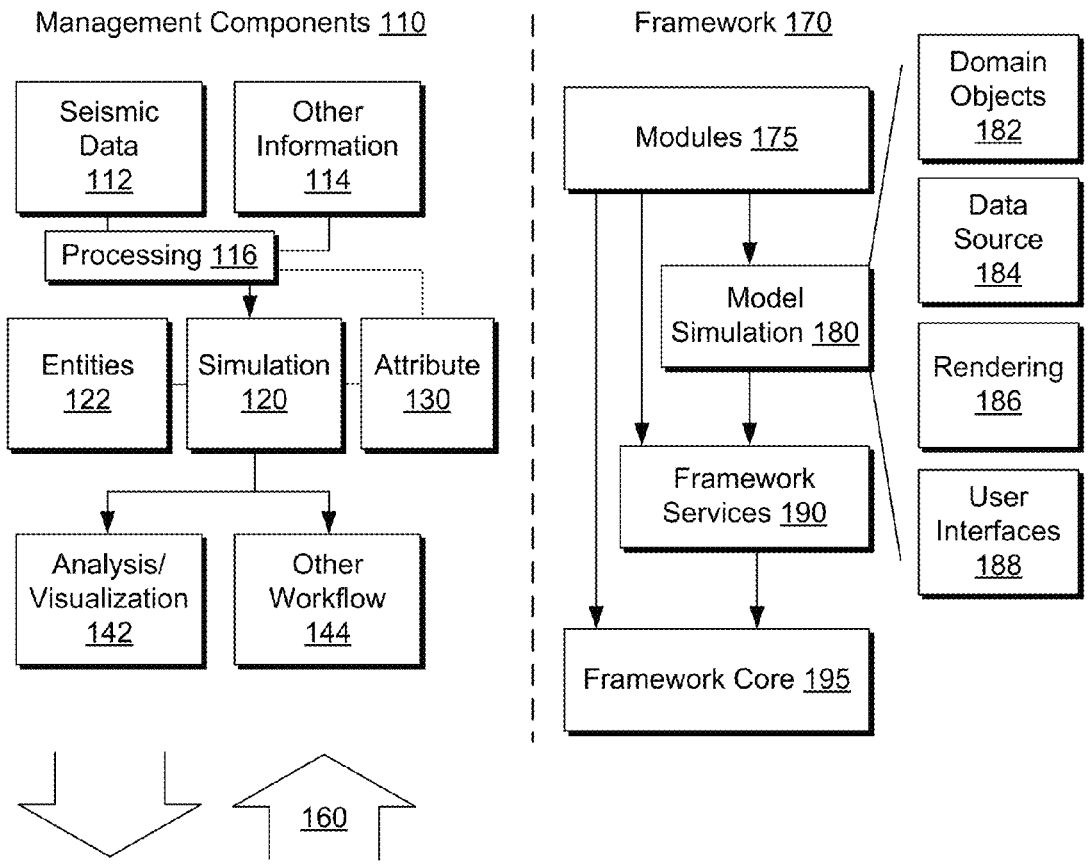
FIG. 1 illustrates an example of a system that includes various components for simulating a geological environment.
Figure 1:
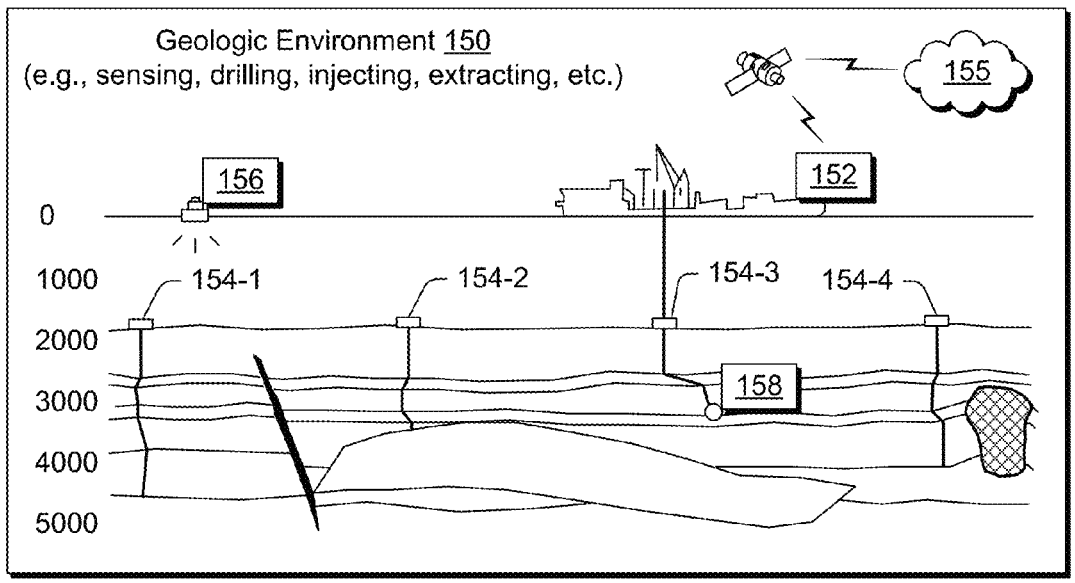

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Seismic interpretation is a process that involves examining seismic data (e.g., with respect to location and time or depth) to identify one or more types of subsurface structures (e.g., horizons, faults, geobodies, etc.). When performing seismic interpretation, seismic data may be provided in the form of traces where, for example, each trace is an amplitude versus time recording of energy emitted by a source that has interacted with various subsurface structures. An interpretation process may involve visual display of seismic data and interaction using one or more tools (e.g., executable instruction modules stored in memory and executed by one or more processors). An interpretation process may consider vertical seismic sections, inline and crossline directions, horizontal seismic sections called horizontal time slices, etc. Seismic data may optionally be interpreted with other data such as, for example, well log data.

As an example, an interpretation process may include accessing seismic data from a data store (e.g., via a network or other connection). Seismic data may be formatted according to one of the SEG-Y format standards (Society of Exploration Geophysicists), the ZGY format standard (e.g., a bricked format) or another format. As an example, seismic data may be stored with trace header information, which may assist in analysis of the seismic data. Seismic data may optionally be accessed, for example, according to a number of traces (e.g., in an inline, crossline or inline and crossline directions), which may be entire traces or portions thereof (e.g., for one or more particular times or depths). As an example, given a number of traces across a region, a process may access some of those traces in a sub-region by specifying inline and crossline indexes (e.g., or geographic or grid coordinates) as well as a time or depth window.

An interpretation process may include determining one or more seismic attributes. A seismic attribute may be considered, for example, a way to describe, quantify, etc., characteristic content of seismic data. As an example, a quantified characteristic may be computed, measured, etc., from seismic data. A seismic attribute may be a rate of change of a quantity (or quantities) with respect to time, space or both time and space. As an example, a seismic attribute may provide for examination of seismic data in an amplitude domain, in a time domain, or in another manner. As an example, a seismic attribute may be based on another seismic attribute (e.g., a second derivative seismic attribute may be based on a first derivative seismic attribute, etc.).

An interpretation framework may include modules (e.g., processor-executable instructions stored in memory) to determine one or more seismic attributes. Seismic attributes may optionally be classified, for example, as volume attributes or surface attributes. As an example, a volume attribute may be an attribute computed from a seismic cube and may result in a new seismic cube that includes information pertaining to the volume attribute. As an example, a surface attribute may be a value associated with a surface of a seismic cube that includes information pertaining to a volume attribute.

A seismic interpretation may be performed using displayable information, for example, by rendering information to a display device, a projection device, a printing device, etc. As an example, one or more color schemes (e.g., optionally including black and white or greyscale) may be referenced for displayable information to enhance visual examination of the displayable information. A color scheme may include a palette, a range, etc. A look-up-table (LUT) or other data structure, function (e.g., linear or non-linear), etc., may allow for mapping of values associated with one or more seismic attributes to intensity, colors (e.g., RGB, YCbCr, etc.), etc. Where the human eye will be used or is used for viewing displayable information, a display scheme may be selected to enhance interpretation (e.g., to increase contrast, provide for blinking, etc.).

A module for determining one or more seismic attributes may include one or more parameters. As an example, a module may include one or more parameters that may be set via a graphic user interface, a specification file, etc. In such an example, an interpreter may wish to examine a seismic attribute for seismic data using one or more values of a parameter. As an example, such a module may provide a default value and a field, graphical control, etc., that allows for input of a value other than the default value.

As an example, seismic interpretation may be performed using seismic to simulation software such as the PETREL® seismic to simulation software framework (Schlumberger Limited, Houston, Tex.), which includes various features to perform attribute analyses (e.g., with respect to a 3D seismic cube, a 2D seismic line, etc.). While the PETREL® seismic to simulation software framework is mentioned, other types of software, frameworks, etc., may be employed for purposes of attribute analyses.

FIG. 1 shows an example of a system 100 that includes various management components 110 to manage various aspects of a geologic environment 150 (e.g., an environment that includes a sedimentary basin) as well as an example of a framework 170. In the example of FIG. 1, the components may be or include one or more modules. As to the management components 110, one or more of these components may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, geobodies, etc. In the system 100, the entities 122 can include virtual representations of actual physical entities that are reconstructed for purposes of simulation. The entities 122 may include entities based on data acquired via sensing, observation, interpretation, etc. (e.g., the seismic data 112 and other information 114).

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT®.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data, geobody classes may define objects for representing geobodies based on seismic data, etc. As an example, an interpretation process that includes generation of one or more seismic attributes may provide for definition of a geobody using one or more classes. Such a process may occur via user input (e.g., user interaction), semi-automatically or automatically (e.g., via a feature extraction process based at least in part on one or more seismic attributes).

In the example of FIG. 1, the simulation component 120 may process information to conform to one or more attributes specified by the attribute component 130, which may include a library of attributes. Such processing may occur prior to input to the simulation component 120. Alternatively, or in addition, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results, attributes, etc. In an example embodiment, output from the simulation component 120, the attribute component 130 or one or more other components may be input to one or more other workflows, as indicated by a workflow component 144 (e.g., for triggering another process).

In an example embodiment, the management components 110 may include features of a commercially available simulation framework such as the PETREL® seismic to simulation software framework. The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components (e.g., or modules) may be implemented as add-ons (or plug-ins) that conform to and operate according to specifications of a framework environment (e.g., according to application programming interface (API) specifications, etc.).

FIG. 1 also shows, as an example, the framework 170, which includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids (e.g., that represent a geologic environment).

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, geobodies, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 158, which may be equipment to drill, acquire information, assist with resource recovery, etc. Other equipment 156 may be located remote from a well site and include sensing, detecting, emitting or other circuitry. Such equipment may include storage and communication circuitry to store and to communicate data, instructions, etc. The geologic environment 150 also shows various wells (e.g., wellbores) 154-1, 154-2, 154-3 and 154-4. In the example of FIG. 1, the downhole equipment 158 may include a drill for drilling the well 154-3.

The framework 170 may provide for modeling the geologic environment 150 including the wells 154-1, 154-2, 154-3 and 154-4 as well as stratigraphic layers, lithologies, faults, etc. The framework 170 may create a model with one or more grids, for example, defined by nodes, where a numerical technique can be applied to relevant equations discretized according to at least one of the one or more grids. As an example, the framework 170 may provide for performing a simulation of phenomena associated with the geologic environment 150 using at least a portion of a grid. As to performing a simulation, such a simulation may include interpolating geological rock types, interpolating petrophysical properties, simulating fluid flow, or other calculating (e.g., or a combination of any of the foregoing).

Figure 2:
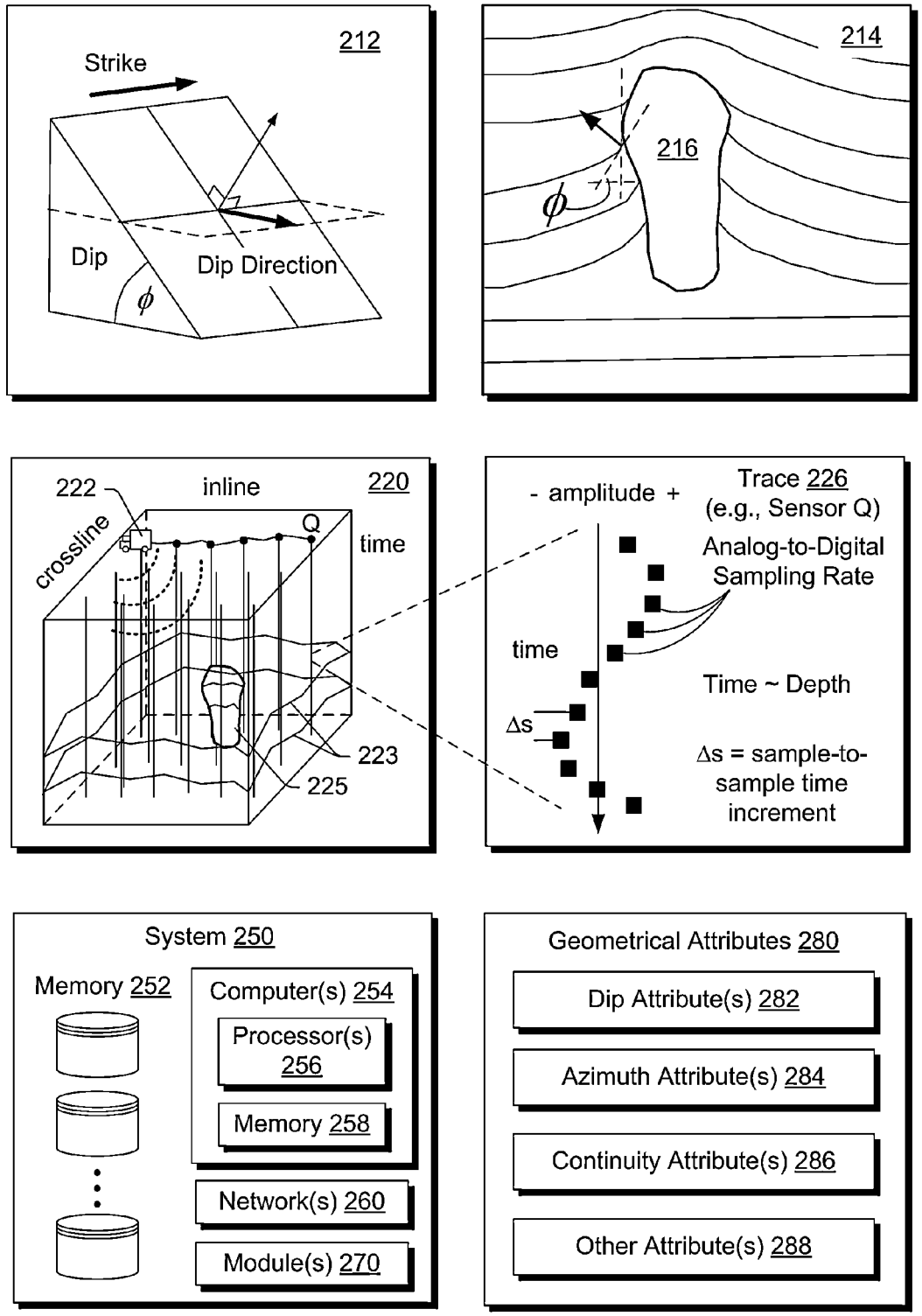
FIG. 2 illustrates examples of azimuth and dip angle, data acquisition, a system and geometrical attributes.

FIG. 2 shows a diagram for an example of a convention for dip (e.g., dip angle) and azimuth 212, a diagram of an example of a geobody 214, diagrams for examples of seismic data 220 and a portion of a trace 226, a block diagram of an example of a system 250 and a block diagram of examples of various geometrical attributes 280 (see also, e.g., the attribute component 130 of FIG. 1).

Seismic interpretation may aim to identify and classify one or more subsurface boundaries based at least in part on azimuth and dip (e.g., dip angle). Dip is the angle of slope of a plane from a horizontal plane (e.g., an imaginary plane) measured in a vertical plane in a specific direction. A dipping plane may be defined by dip angle (e.g., also known as magnitude or amount) and azimuth (e.g., also known as direction). As shown in the diagram 212 of FIG. 2, azimuth may be defined as a direction with respect to a surface whereas dip angle (e.g., or "dip") may be defined as the angle of that surface. In terms of attitude, strike direction may be defined as a compass bearing of a horizontal line on a dipping layer where dip may be the angle of the inclination of the bed measured perpendicular to the strike direction. Azimuth (e.g., direction) may be specified by a compass direction (e.g., 0 degrees to 360 degrees), for example, based on the strike of a dipping plane. As an example, dip can be defined as the steepest angle of descent of a tilted bed or feature relative to a horizontal plane and may be specified using an angle between 0 degrees and 90 degrees and optionally a letter (e.g., N, S, E, and W) or other moniker to denote an approximate direction in which the bed is dipping. As an example, various types of features may be described, at least in part, by dip, at least in part by azimuth, etc. (e.g., sedimentary bedding, faults and fractures, cuestas, igneous dikes and sills, metamorphic foliation, etc.).

Some additional terms related to dip and strike may apply to an analysis, for example, depending on circumstances, orientation of collected data, etc. One term is "true dip". True dip is the dip of a plane measured exactly perpendicular to strike and also the maximum possible value of dip magnitude. Another term is "apparent dip". Apparent dip may be the dip of a plane as measured in any other direction except in the direction of true dip; however, it is possible that the apparent dip is equal to the true dip. For example, the term apparent dip (e.g., in an analysis), for a particular dipping plane, may be equivalent to the true dip of that particular dipping plane.

As shown in the diagram 214 of FIG. 2, a geobody 216 may be present in a geologic environment (see also, e.g., the geologic environment 150 of FIG. 1). For example, the geobody 216 may be a salt dome. A salt dome may be a mushroom-shaped or plug-shaped diapir made of salt and may have an overlying cap rock. Salt domes can form as a consequence of the relative buoyancy of salt when buried beneath other types of sediment. Hydrocarbons may be found at or near a salt dome due to formation of traps due to salt movement in association evaporite mineral sealing. Buoyancy differentials can cause salt to begin to flow vertically (e.g., as a salt pillow), which may cause faulting. In the diagram 214, the geobody 216 is met by layers which may each be defined by a dip angle $\phi$.

As mentioned, seismic data may be acquired for a region in the form of traces. In the example of FIG. 2, the diagram 220 shows acquisition equipment 222 emitting energy from a source (e.g., a transmitter) and receiving reflected energy via one or more sensors (e.g., receivers) strung along an inline direction. As the region includes layers 223 and a geobody 225, energy emitted by a transmitter of the acquisition equipment 222 can reflect off the layers 223 and the geobody 225. Evidence of such reflections may be found in the acquired traces. As to the portion of a trace 226, energy received may be discretized by an analog-to-digital converter that operates at a sampling rate. For example, the acquisition equipment 222 may convert energy signals sensed by sensor Q to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

In the example of FIG. 2, the system 250 includes one or more memory storage devices 252, one or more computers 254, one or more networks 260 and one or more modules 270. As to the one or more computers 254, each computer may include one or more processors (e.g., or cores) 256 and memory 258 for storing instructions (e.g., modules), for example, executable by at least one of the one or more processors. As an example, a computer may include one or more network interfaces (e.g., wired or wireless), one or more graphics cards, a display interface (e.g., wired or wireless), etc.

In the example of FIG. 2, the one or more memory storage devices 252 may store seismic data for a geologic environment that spans kilometers in length and width and, for example, around 10 km in depth. Seismic data may be acquired with reference to a surface grid (e.g., defined with respect to inline and crossline directions). For example, given grid blocks of about 40 meters by about 40 meters, a 40 km by 40 km field may include about one million traces. Such traces may be considered 3D seismic data where time approximates depth. As an example, a computer may include a network interface for accessing seismic data stored in one or more of the storage devices 252 via a network. In turn, the computer may process the accessed seismic data via instructions, which may be in the form of one or more modules. As an example, a dip attribute module may be provided for processing seismic data.

In the example of FIG. 2, the geometrical attributes 280 include one or more dip attributes 282, one or more azimuth attributes 284, one or more continuity attributes 286, and one or more other attributes 288. Such attributes may be part of a structural attributes library (see, e.g., the attribute component 130 of FIG. 1). Structural attributes may assist with edge detection, local orientation and dip of seismic reflectors, continuity of seismic events (e.g., parallel to estimated bedding orientation), etc. As an example, an edge may be defined as a discontinuity in horizontal amplitude continuity within seismic data and correspond to a fault, a fracture, etc. Geometrical attributes may be spatial attributes and rely on multiple traces.

Figure 3:
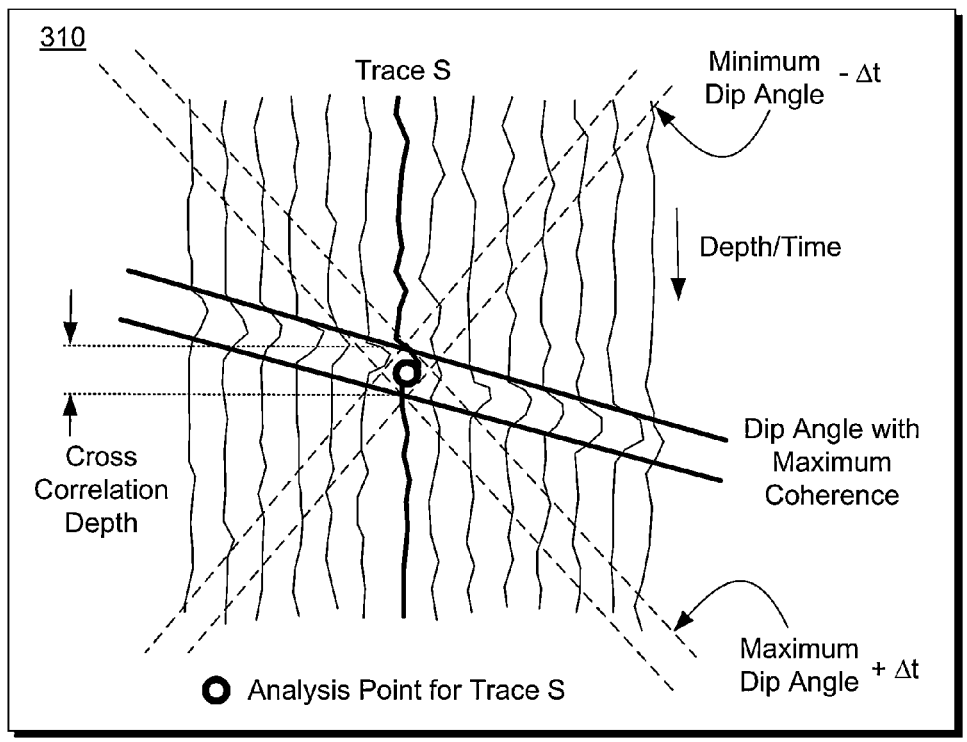
FIG. 3 shows an example of a coherence approach to determining dip angle.
Figure 3:
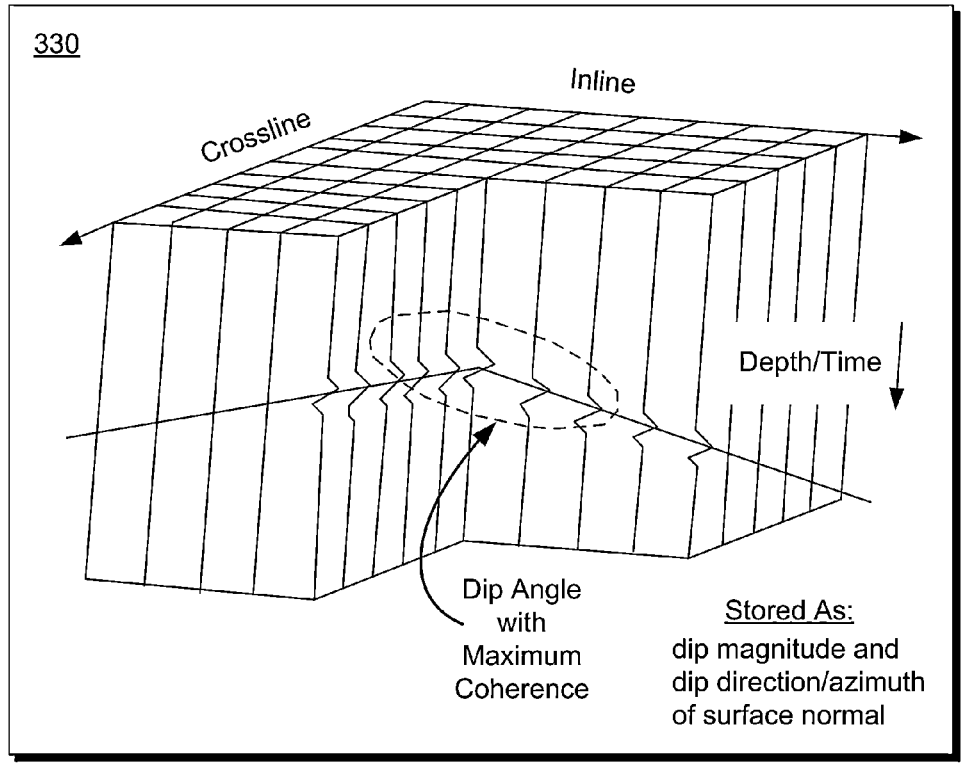

As mentioned, as an example, seismic data for a region may include one million traces where each trace includes one thousand samples for a total of one billion samples. Resources involved in processing such seismic data in a timely manner may be relatively considerable by today's standards. FIG. 3 shows a 2D diagram 310 and a 3D diagram 330 of a dip scan approach, which involves processing seismic data with respect to discrete planes (e.g., a volume bounded by discrete planes). Depending on the size of the seismic data, such an approach may involve considerable resources for timely processing. The approach shown in FIG. 3 may look at local coherence between traces and their amplitudes, and therefore may be classified in the category of "apparent dip."

Referring to the diagram 310 of FIG. 3, a 2D search-based estimate of coherence is shown with respect to a range of discrete dip angles. Such an approach may estimate coherence using semblance, variance, principle component analysis (PCA), or another statistical measure along a discrete number of candidate dips and arrive at an instantaneous dip based on a coherence peak. The diagram 330 of FIG. 3 shows a 3D search-based estimate of coherence, which is analogous to the 2D approach shown in the diagram 310 and may use an inline vector and a crossline vector for time dip (e.g., along coherent peaks in inline and crossline directions). In the example of FIG. 3, as shown in the 3D diagram 330, dip angle with maximum coherence may be stored as a dip magnitude and dip direction/azimuth (see, e.g., the diagram 212 of FIG. 2).

3D or volumetric dip can assist in processes such as structural restoration workflows, which may aim to invert relative depositional history of individual layers in a volume. As an example, given a priori information and well data, a relative depositional history may be converted into geological time for individual layers (e.g., to assist exploration workflows). As an example, an approach may involve human interaction in a semi-automated manner that includes interpretation of horizons in a subterranean formation via user identification and selection of horizon features. Such an approach can be time-consuming and may focus on a relatively small region of the sub-surface. While efforts to increase automation may try to leverage estimates of structural dip, a precise format for such estimated dips may not exist, for example, because structural dip may be defined based on direction (e.g., dip magnitude and dip direction/azimuth) of surface normal at any point in the volume (see, e.g., the diagram 212 of FIG. 2).

In approaches where the surface normal is constructed by averaging of the positive dip (e.g., from current trace to the next trace) and the negative dip (e.g., from current trace to the previous trace), in inline and crossline directions, such a format has half the resolution of a positive/negative dip representation. An approach for volumetric dip that offers a full theoretical resolution is described in U.S. patent application Ser. No. 12/891,859, entitled "Consistent Dip Estimation for Seismic Imaging" (Pub. No. US 2011/0118985 of May 19, 2011, which is incorporated by reference herein).

Dip estimation techniques that assume that a sub-surface volume conforms to a "layer-cake" model (i.e. that the sub-surface is just a stack of laterally infinitely continuous surfaces, possibly with close-to zero thickness at some locations) can fail to account for sub-surface objects (e.g. channels, salt bodies, etc.) that can have finite lateral extents (e.g., structural discontinuities can outline boundaries of such objects). In such situations, where a discontinuity may exist, the concept of a discontinuity dip attribute is lacking as dip is defined as a spatial derivative of a structure and the derivative is per definition undefined at discontinuities. For example, for a reflector, positive dip and negative dip for a location with respect to a trace may not be equal such that a reflector normal vector for a peak at that location may be pointing vertically, indicating a zero dip at that location, which may be inaccurate.

The approach described in the aforementioned application (US 2011/0118985) can decouple dip through definition of a positive dip and a negative dip. Thus, for example, at a given point in a volume, the positive dip (e.g., to the right) and the negative dip (e.g., to the left) may not necessarily have uniform slope across the given point. Such an approach can alleviate first derivative concerns, especially where a boundary may exist within a subsurface volume (e.g., channel, fault, body, etc.).

As an example, for a volumetric dip model, such as the model described in US 2011/0118985, the following information may be provided for points (e.g., p(i,j,k)) in a sub-surface volume: (i) positive inline dip; (ii) negative inline dip; (iii) positive crossline dip; (iv) negative crossline dip; and (v) dip uncertainty. With respect to data structure or data storage demands, such an approach can be represented, for example, using five volumes (e.g., of similar size as an input seismic data volume) that represent the sub-surface environment (e.g., as imaged by seismic data). As an example, a unit for dip can be defined as millisecond per trace, or meter per trace, or another isomorphic unit of choice (e.g. angle). In such an example, a lateral coordinate system may be indexed by inline and crossline numbers; noting that another coordinate system could be used (e.g. based on row/column numbers, geographical position in x/y coordinates, etc.).

Figure 4:
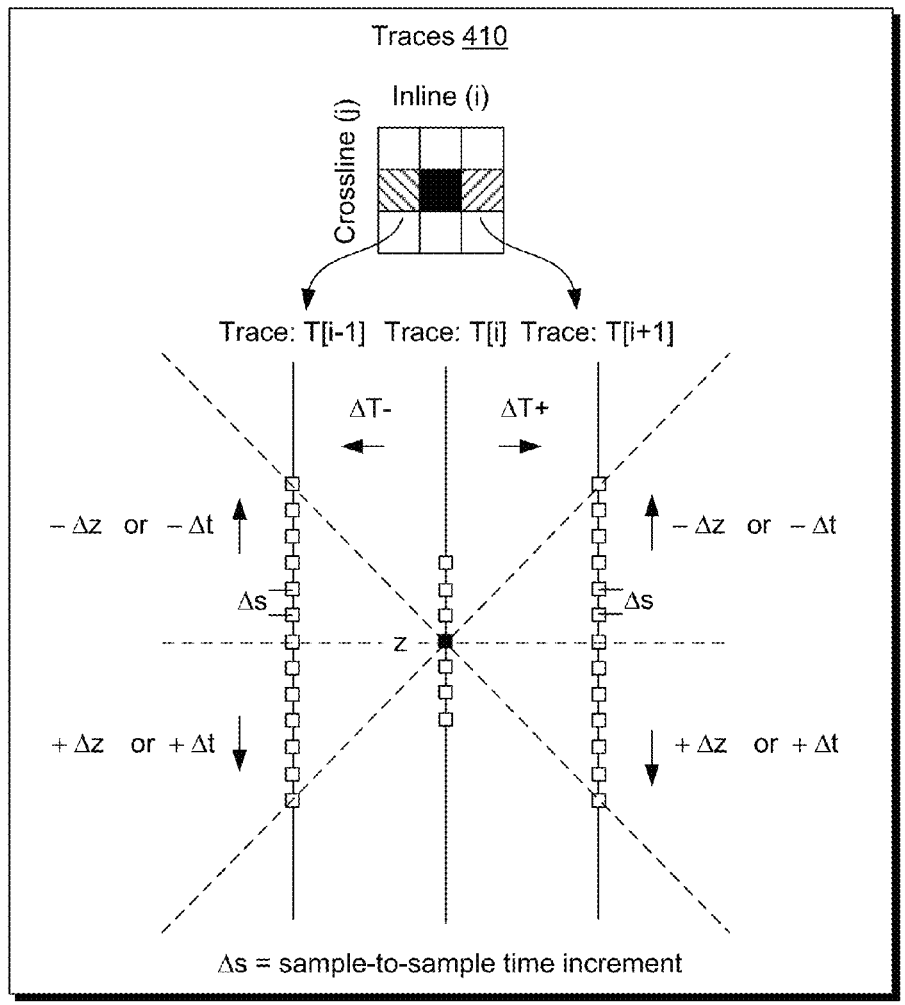
FIG. 4 illustrates an example of a Taylor series expansion technique for use in determining one or more dip seismic attributes.

FIG. 4 shows an example of a technique to determine dip values from seismic data (see, e.g., US 2011/0118985). In particular, FIG. 4 shows a series of traces 410 and a method 430 that implements a Taylor series expansion. The series of traces 410 includes various parameters, for example, for trace position in a 2D inline and crossline coordinate system and for sample location with respect to time or depth. Also shown is a sample-to-sample time increment $\Delta s$, which may be, for example, converted to a sample-to-sample depth increment.

As to the method 430, a trace T[i] and a trace T[i−1] are considered as being related by equation 434. By applying a Taylor series expansion, the equation can be represented as equation 438. By rearranging the equation 438, the equation 442 is provided, which can be solved for $\Delta z(z)$, which represents a time or depth displacement for "z" between trace T[i] and trace T[i−1], which may be stored as a negative dip value for the trace T[i] and a location defined by the sample "z". As an example, a feature exists at "z" in the trace T[i] and evidence of that feature exists in the trace T[i−1] at a location displaced by a distance or time from that of the trace T[i], where the displacement is represented by $\Delta z$. As that displacement is with respect to a prior trace with respect to the inline coordinate, for trace T[i], that displacement is a negative dip for the trace T[i]. Equations may be applied for a positive dip for the trace T[i], for example, with respect to the trace T[i+1]. Further, equations may applied for both negative dip and positive dip with respect to the crossline coordinate (e.g., T[j], T[j−1], and T[j+1]). In such a manner, values for four of the five volumes may be determined. As to the uncertainty data volume, as an example, it may include quality control data, consistency data, inconsistency data or other data that indicates uncertainty as to one or more dip values (e.g., at a location or locations in a sub-surface volume).

As indicated in the example of FIG. 4, a method may implement a Taylor series expansion technique for calculating time/depth-varying timing difference (e.g., structural dip) between traces in positive and negative directions. As an example, a method may implement a technique other than a Taylor series expansion for calculating time/depth-varying timing difference (e.g., structural dip) between traces. For example, a cross-correlation technique may be implemented, a technique based on a phase shift analysis between traces, etc. As an example, a method may implement a Taylor series expansion technique and another technique for calculating time/depth-varying timing difference (e.g., structural dip) between traces.

Figure 5:
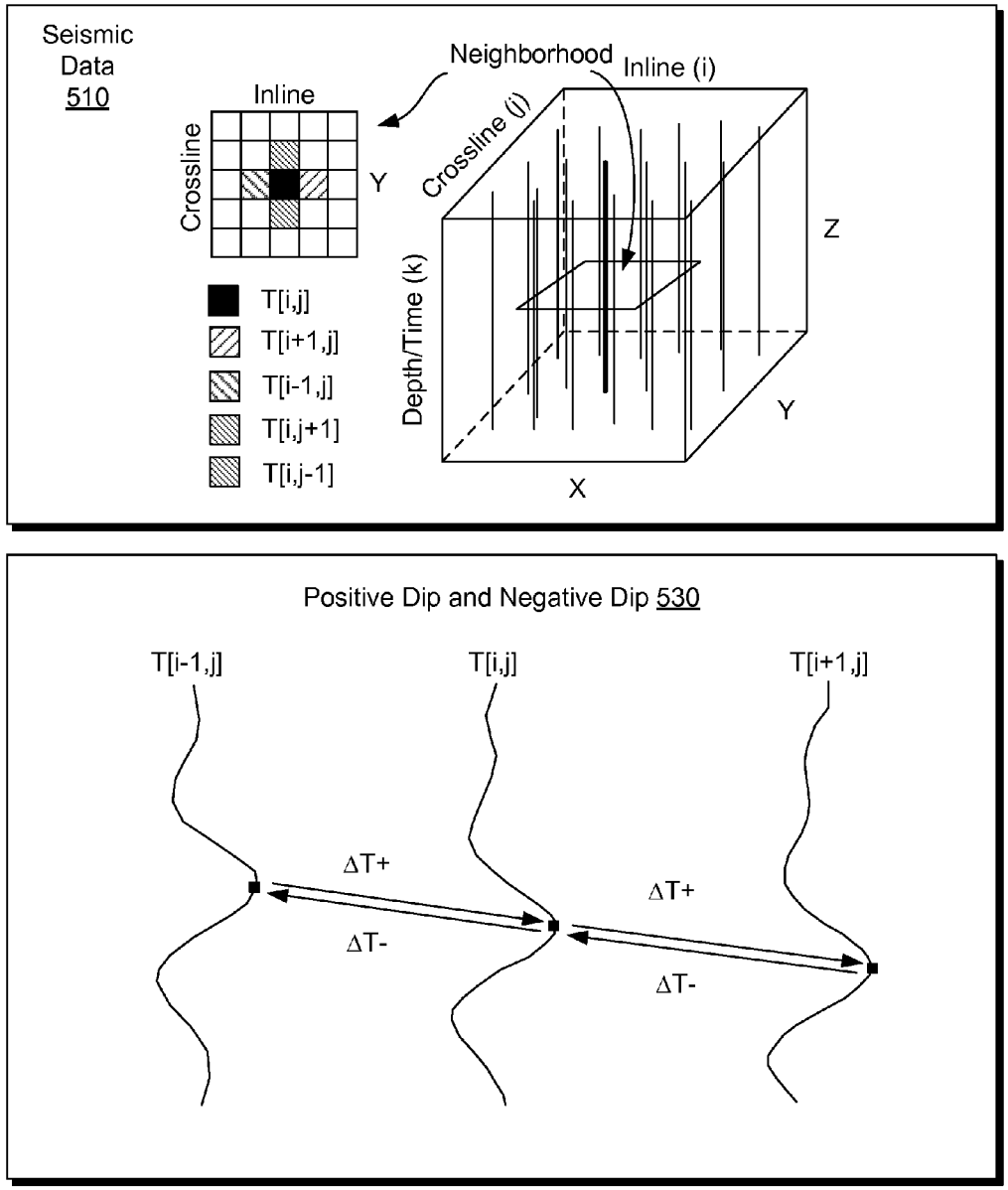
FIG. 5 illustrates an example of a seismic data, positive dip attributes and negative dip attributes for the seismic data, and an example of a method
Figure 5:
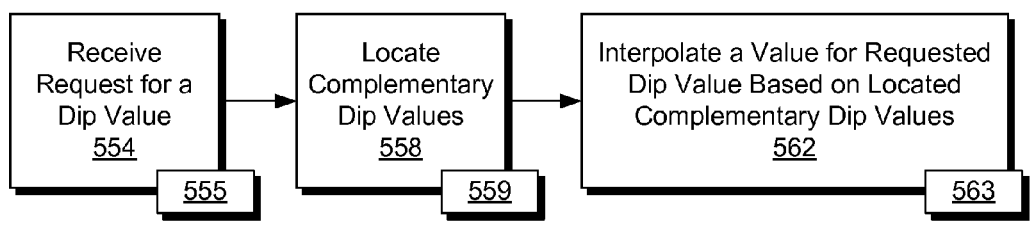

FIG. 5 shows an example of seismic trace data 510, an example of a series of seismic traces 530 and an example of a method 550. As shown, the seismic trace data 510 is organized with respect to an inline index "i", a crossline index "j" and a depth or time index "k", which may be equated to a depth in a subsurface volume. The indexes i, j and k may relate to a Cartesian coordinate system of X, Y and Z, respectively, for example, directly, via mapping, etc. As an example, indexes that relate to a cylindrical coordinates system (R, Z, $\Theta$) or other coordinate system may be used.

The series of traces 530 correspond to a series of inline traces for a given crossline index value. For the trace T[i,j], a positive dip value can be defined with respect to the trace T[i+1,j] and a negative dip value can be defined with respect to the trace T[i−1,j]. As indicated, a negative dip value can be defined for the trace T[i+1,j] with respect to the trace T[i,j] and a positive dip value can be defined for the trace T[i−1,j] with respect to the trace T[i,j].

In the example of FIG. 5, a positive dip ($\Delta T+$) at trace T[i−1] is equal to a negative dip ($\Delta T-$) at trace T[i] and a positive dip at trace T[i] is equal to a negative dip at trace T[i+1]. Such equalities may be deemed natural consistencies where, otherwise, if one started to follow a signed path out from a starting point and then follow the signed path backwards, the resulting end point would be different than the starting point.

In vector calculus, curl is a vector operator that describes infinitesimal rotation of a 3D vector field where at points in the field, the curl of that field can be represented by a vector (e.g., length and direction that characterize rotation at a point). The aforementioned natural consistencies may be defined using curl.

Direction of curl is an axis of rotation (e.g., as determined by the right-hand rule) and magnitude of curl is magnitude of rotation. In fluid dynamics, a vector field whose curl is zero is referred to as irrotational. Curl is a form of differentiation for vector fields that has a corresponding form in Stokes' theorem, which relates surface integral of curl of a vector field to a line integral of a vector field around a boundary curve. Alternative terminology "rotor" or "rotational" and alternative notations "rot F" and "∇×F" (e.g., del operator and cross product) may be used for "curl" and "curl F".

As an example, a positive dip can, assuming a reasonably vertically smooth dip model, be reconstructed from negative dip estimates where positive and negative dips abide by the natural consistencies (e.g., they are "consistent"). Accordingly, curl of a surface, defined by integration of the dip fields, is zero (e.g., or tends to zero given some small amount of error). Thus, for a given sample, where a reliable dip estimate exists, and one follows the sample along the given negative dip to a new position in a previous trace, then the positive dip at that new position will be equal to the negative dip that led to that new position from the starting position.

Given the natural consistencies or curl properties, a type of symmetry exists between positive and negative dips. As described with respect to FIG. 5, a method can include reconstructing a positive dip from negative dips, or the opposite, reconstructing a negative dip from positive dips. Further, such a method can include one or more uncertainty checks, for example, to determine if sufficient reliable dip estimates exist at one or more locations. With respect to the technique of FIG. 4, such checks may include accessing uncertainty data (e.g., or consistency data, inconsistency data, etc.), for example, as stored in a dip uncertainty volume.

A consequence of the aforementioned "symmetry" is that a positive dip volume can be constructed from a negative dip volume and vice versa and, consequently, three volumes may be persisted rather than five volumes. Thus, a technique such as the technique of FIG. 4 may maintain its dip model resolution by persisting (e.g., saving to memory), for example, the following three volume sets: (i) negative inline dip; (ii) negative crossline dip; and (iii) dip uncertainty (e.g., or consistency, inconsistency, etc.). As an example, alternatively, resolution may be maintained by persisting (e.g., saving) the following three volume sets: (i) positive inline dip; (ii) positive crossline dip; and (iii) dip uncertainty (e.g., or consistency, inconsistency, etc.).

By persisting three volume sets rather than five volume sets, as an example, a theoretical 40% reduction in memory (e.g., disk volume) and a theoretical 40% decrease in I/O cost (e.g., as transfer speed between a disk-based storage device and memory) may be realized. An added cost would be incurred, for example, for reconstruction of positive dip fields from negative dip fields or vice versa. For circumstances where a processor outpaces a memory bus (e.g. processor idle time while waiting for data), time to re-compute positive dips from negative dips can be smaller than time to read pre-computed positive dip data from a disk-based storage device.

As to the method 550, it includes a reception block 554 for receiving a request for a dip value, a locate block 558 for locating complementary dip values and an interpolate block 562 for interpolating a value for the requested dip value based on the located complementary dip values. As to a complimentary dip, such a dip is a positive dip where a negative dip has been requested and a negative dip where a positive dip has been requested. For example, as to the series of traces 530, if a positive dip is requested for the trace T[i,j], then a complementary dip would be a negative dip of the trace T[i+1,j]. As another example, as to the series of traces 530, if a negative dip is requested for the trace T[i,j], then a complementary dip would be a positive dip of the trace T[i−1,j]. As to interpolation, two complementary dips may be located and used to provide a value for a requested dip.

The method 550 is shown in FIG. 5 in association with various computer-readable media (CRM) blocks 555, 559 and 563. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 550. As an example, a computer-readable medium (CRM) may be a computer-readable storage medium. As an example, the memory 258 of FIG. 2 may provide for storage of instructions executable by one or more of the one or more processors 256 of FIG. 2. Thus, the memory 258 may be a CRM as in FIG. 5.

As an example, a method can include interpolating negative dips to output a positive dip or vice versa. Thus, given an array of negative dip values, an algorithm may be provided and implemented to generate a positive dip value a selected sample position.

With such an algorithm, as an example, a method can iterate over samples and traces in a dip model and construct a positive inline dip field and a positive crossline dip field via repeated calls to the algorithm and access to a negative inline dip field and a negative crossline dip field, respectively (e.g., or vice versa). As mentioned, where a computing system is configured for parallel processing (e.g., using processor cores of a CPU, processor cores of a GPU, etc.), processing may occur in parallel to construct such fields.

As an example, a method can include receiving a request for a dip value for a location within a sub-surface volume; responsive to the request, locating complementary dip values for locations within the sub-surface volume where the location for the requested dip value lies within bounds defined by the locations for the complementary dip values; and interpolating a value for the requested dip value based on the complementary dip values. In such a method, receiving may include receiving a request for a positive dip value, and locating may include locating negative dip values as complementary dip values. Furthermore, receiving may include receiving a request for a negative dip value, and locating may include locating positive dip values as complementary dip values. Such a method may include repeating for a plurality of requests, for example, for region of the sub-surface volume or the entire sub-surface volume.

As an example, locating can include accessing a data set that includes negative inline dip values, negative crossline dip values and uncertainty values for the sub-surface volume; or, for example, accessing a data set that includes positive inline dip values, positive crossline dip values and uncertainty values for the sub-surface volume.

As an example, a method can include performing a path analysis for a location of the requested dip value using at least two paths within the sub-surface volume. In such an example, path analysis may determine if path invariance exists for the location of the requested dip value based on curl of a dip field.

As an example, a method can include providing a dip model derived from seismic data using a Taylor series expansion technique. For example, such a dip model may be derived using a Taylor series expansion technique as described with respect to FIG. 4. As to examples of other techniques, a method may implement a cross-correlation technique, a phase-based technique, etc.

As an example, a system can include one or more processors, memory and instructions stored in the memory and executable by at least one of the one or more processors to instruct the system to, responsive to a request for a dip value for a location within a sub-surface volume, locate complementary dip values for locations within the sub-surface volume where the location for the requested dip value lies within bounds defined by the locations for the complementary dips values, and interpolate a value for the requested dip value based on the complementary dip values. For example, the system 250 of FIG. 2 may include instructions such as instructions associated with the method 550 of FIG. 5.

As an example, a system can include instructions to instruct the system to calculate path attribute values for locations within a sub-surface volume where the path attribute values represent curl of a dip field within the sub-surface volume; to compare interpolated value for a requested dip value to a dip value determined based on seismic data and a Taylor series expansion; calculate difference attribute values based differences between interpolated values and dip values determined based on seismic data and a Taylor series expansion; access a data set that includes at least positive dip values or at least negative dip values for the sub-surface volume; calculate derivative attribute values for a dip field within a sub-surface volume where the derivative attribute values represent vertical smoothness of the dip field; and/or calculate a quality control attribute based at least in part on interpolated dip values where the quality control attribute indicates quality of regional dip field values for calculating interpolated dip values, for example, where the quality control attribute that indicates quality of regional dip field values for calculating interpolated dip values indicates regional chaos. As to examples of techniques other than Taylor series, instructions may be provided for implementation of a cross-correlation technique, a phase-based technique, etc.

As an example, one or more computer-readable storage media can include computer-executable instructions to instruct a computing system to: receive dip values determined based on volumetric seismic data and Taylor series expansion; calculate interpolated dip values based on the received dip values; and render the interpolated dip values to a display. As an example, such one or more storage media may include instructions to calculate curl values for a dip field defined by the interpolate dip values and, for example, render the curl values to the display. As to examples of techniques other than Taylor series, instructions may be provided for implementation of a cross-correlation technique, a phase-based technique, etc.

As an example, one or more computer-readable storage media can include computer-executable instructions to instruct a computing system to receive positive dip values and negative dip values based on volumetric seismic data and Taylor series expansion and, where the interpolated dip values include positive dip values, calculate difference values between the interpolated dip values and the received positive dip values and, where the interpolated dip values include negative dip values, calculate difference values between the interpolated dip values and the received negative dip values. As an example, instructions may also be stored to render such difference values to the display (e.g., for a workflow analysis, interpretation, etc.).

Figure 6:
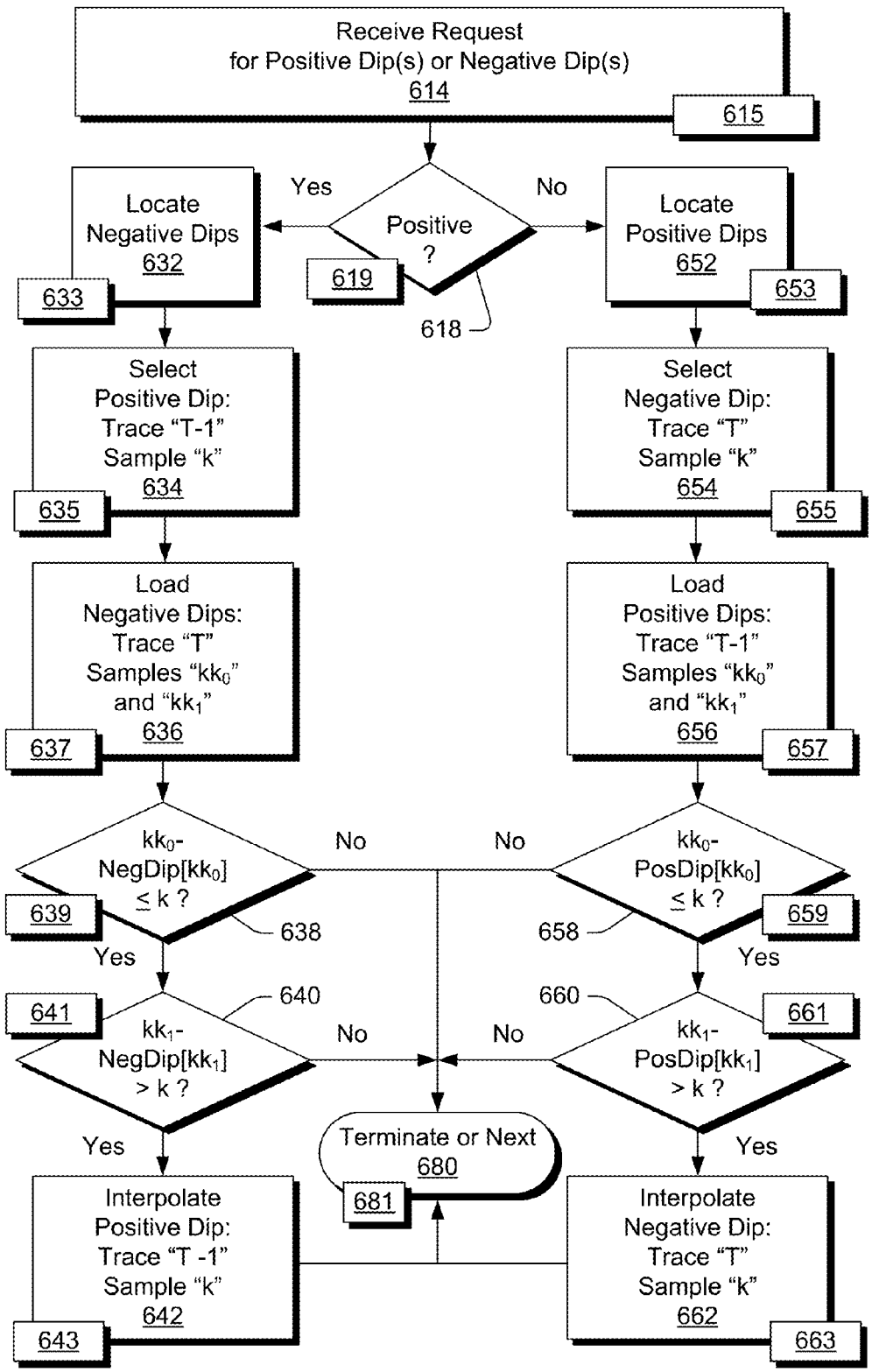
FIG. 6 illustrates an example of a method for determination of a dip seismic attribute.

FIG. 6 shows an example of a method 600 for determining a dip seismic attribute. The method 600 includes a reception block 614 for receiving a request for determination of one or more positive dips or one or more negative dips, for example, where a "dip" may be a dip seismic attribute. Responsive to receipt of the request, the method 600 includes a decision block 618 for deciding whether the received request is for positive dip(s) where for a positive dip, the method 600 continues to a locate block 632 for locating negative dips (e.g., a positive dip from a negative dips branch) otherwise the method 600 continues to a locate block 652 for locating positive dips (e.g., a negative dip from positive dips branch).

In the example of FIG. 6, where the decision block 618 decides to proceed to the locate block 632, negative dip values (e.g., negative dips) are located. Such values may be stored in a data storage device, which may be local or remote and correspond to "volume" data (e.g., volumetric seismic attribute data). In the example, of FIG. 6, the method 600 shows various blocks for determining a single positive dip value from negative dip values (e.g., negative dips). Where multiple dip values are requested, a process to determine positive dips from negative dips may proceed in a parallel manner or a serial manner. For example, where parallel processing is available, various blocks of the method 600 may be implemented in parallel.

In the example of FIG. 6, after locating negative dip values, the method 600 continues at a selection block 634 to select a positive dip for determination, for example, for a seismic trace "T−1" and at a location defined by sample "k". In response, the method 600 continues at a load block 636 that loads negative dip values from the located negative dip values, for example, for a seismic trace "T" and at locations defined by samples "$kk_0$" and "$kk_1$". Prior to proceeding to determination of the positive dip value for trace "T−1" at the location defined by sample "k", the method 600 continues at two decision blocks 638 and 640 for deciding whether the location defined by sample "k" is within certain location bounds defined by samples "$kk_0$" and "$kk_1$". Specifically, the decision block 638 decides if $kk_0$−NegDip[$kk_0$] is less than or equal to k while the decision block 640 decides if $kk_1$−NegDip[$kk_1$] is greater than k. In the decision block 638 and 640, the NegDip[$kk_0$] and the NegDip[$kk_1$] identify in conjunction with $kk_0$ and $kk_1$ locations with respect to trace "T−1". If the decision block 638 or 640 decides that the location defined by k for the trace "T−1" does not meet their respective criterion, then the method 600 continues to a termination or next block 680. For example, where a request is for a single positive dip value, the method 600 may terminate whereas if the request is for multiple positive dip values, the method 600 may essentially skip the instant determination for a positive dip value (e.g., for the trace "T−1" at sample location "k") and move on to a next positive dip value at another trace, another sample location, etc.

In the example of FIG. 6, where the decision blocks 638 and 640 decide that the location defined by the sample "k" meets the conditions, then the method 600 continues at an interpolation block 642 for interpolating a positive dip value for the trace "T−1" at the location defined by the sample "k" based at least in part on the negative dip values for the trace "T" and locations defined by the samples "$kk_0$" and "$kk_1$". After such an interpolation, the method 600 may continue to the termination or next block 680.

In the example of FIG. 6, where the decision block 618 decides to proceed to the locate block 652, positive dip values (e.g., positive dips) are located. Such values may be stored in a data storage device, which may be local or remote and correspond to "volume" data (e.g., volumetric seismic attribute data). In the example, of FIG. 6, the method 600 shows various blocks for determining a single negative dip value from positive dip values (e.g., positive dips). Where multiple dip values are requested, a process to determine negative dips from positive dips may proceed in a parallel manner or a serial manner. For example, where parallel processing is available, various blocks of the method 600 may be implemented in parallel.

In the example of FIG. 6, after locating positive dip values, the method 600 continues at a selection block 654 to select a negative dip for determination, for example, for a seismic trace "T" and at a location defined by sample "k". In response, the method 600 continues at a load block 656 that loads positive dip values from the located positive dip values, for example, for a seismic trace "T−1" and at locations defined by samples "$kk_0$" and "$kk_1$". Prior to proceeding to determination of the negative dip value for trace "T" at the location defined by sample "k", the method 600 continues at two decision blocks 658 and 660 for deciding whether the location defined by sample "k" is within certain location bounds defined by samples "$kk_0$" and "$kk_1$". Specifically, the decision block 658 decides if $kk_0$−PosDip[$kk_0$] is less than or equal to k while the decision block 660 decides if $kk_1$−PosDip[$kk_1$] is greater than k. In the decision block 638 and 660, the PosDip[$kk_0$] and the PosDip[$kk_1$] identify in conjunction with $kk_0$ and $kk_1$ locations with respect to trace "T". If the decision block 658 or 660 decides that the location defined by k for the trace "T" does not meet their respective criterion, then the method 600 continues to a termination or next block 680. For example, where a request is for a single negative dip value, the method 600 may terminate whereas if the request is for multiple negative dip values, the method 600 may essentially skip the instant determination for a negative dip value (e.g., for the trace "T" at sample location "k") and move on to a next negative dip value at another trace, another sample location, etc.

In the example of FIG. 6, where the decision blocks 658 and 660 decide that the location defined by the sample "k" meets the conditions, then the method 600 continues at an interpolation block 662 for interpolating a negative dip value for the trace "T" at the location defined by the sample "k" based at least in part on the positive dip values for the trace "T−1" and locations defined by the samples "$kk_0$" and "$kk_1$". After such an interpolation, the method 600 may continue to the termination or next block 680.

The method 600 is shown in FIG. 6 in association with various computer-readable media (CRM) blocks 615, 619, 633, 635, 637, 639, 641, 643, 653, 655, 657, 659, 661, 663 and 681. Such blocks generally include instructions suitable for execution by one or more processors (or processing cores) to instruct a computing device or system to perform one or more actions. While various blocks are shown, a single medium may be configured with instructions to allow for, at least in part, performance of various actions of the method 600. As an example, a computer-readable medium (CRM) may be a computer-readable storage medium. As an example, the memory 258 of FIG. 2 may provide for storage of instructions executable by one or more of the one or more processors 256 of FIG. 2. Thus, the memory 258 may be a CRM as in FIG. 6.

Figure 7:
FIG. 7 illustrates examples of seismic data and various dip seismic attributes.
Figure 7:
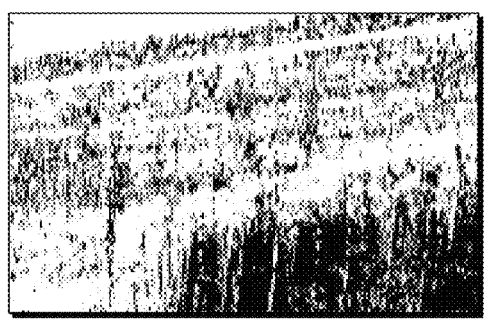
Figure 7:
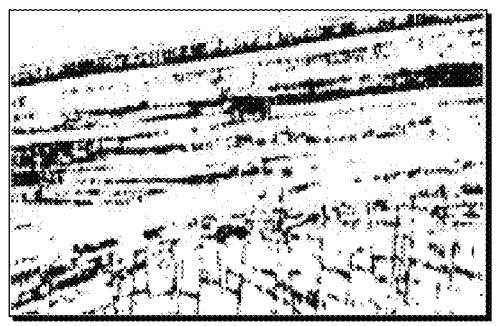
Figure 7:
Figure 7:
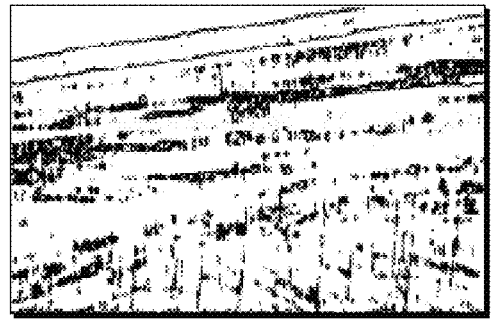
Figure 7:

FIG. 7 shows some examples of data 710, 720, 730, 740, 750 and 760 with respect to an inline coordinate and a depth or time coordinate where the data 710 is seismic data, the data 720 is positive dip data calculated using the aforementioned technique of FIG. 4, the data 730 is uncertainty data (e.g., consistency, inconsistency, etc.) calculated using the aforementioned technique of FIG. 4, the data 740 is positive dip data 740 constructed from negative dip data (not shown) calculated using the aforementioned technique of FIG. 4, the data 750 is difference data calculated based on the data 720 and the data 740 and the data 760 is root-mean-square derivative data, which may be a metric or attribute for purposes of assessing or interpreting the seismic data 710 or other data based at least in part on the seismic data 710.

As an example, the data 730 may be uncertainty measure data for the positive dip data 720 as calculated by a technique such as the technique of FIG. 4. As an example, the data 730 may be quality control data. In the example of FIG. 7, the data 730 shows that uncertainty is higher in "chaotic" areas (e.g., lower portion of the plot of uncertainty values with respect to inline and depth/time) and along major faults (e.g., upper portion of the plot of uncertainty values with respect to inline and depth/time).

In the example of FIG. 7, the positive dip data 740, as mentioned, is calculated based on interpolation calculations such as those of interpolation block 542 of the method 500 to output a positive dip.

In FIG. 7, the difference data 750 corresponds to absolute values of differences between the positive dip data 720 and calculated positive dip data 740 (e.g., using interpolations based on negative dip data). In the example of FIG. 7, interpolation fails to construct positive dips from negative dips in some areas, for example, where the underlying technique (see, e.g., technique of FIG. 4) failed to converge to a stable dip model (e.g., via an iterative process that aims to output a dip model). In this example, as the underlying negative dip data (not shown) upon which interpolation operates to calculate positive dip data (see the data 740) has associated high uncertainty (e.g., lack of consistency), even the positive dip data 720 at those locations have high uncertainty. Where the underlying technique that generates a negative dip field (or a positive dip field) generates data with high uncertainty, interpolation of that field to generate a positive dip field (or a negative dip field) will likewise have high uncertainty.

As to areas where the underlying dip estimation technique did not converge to a stable dip model, error introduced by saving negative dip values and constructing positive dip values therefrom via interpolation is on average of the order of about 0.004 ms per trace (e.g., of the order of about 1/1000 of sample distance, for a sample rate of 4 milliseconds). For the example of FIG. 7, the error tends to be substantially smaller (e.g., several orders of magnitude smaller) than accuracy of various dip estimation techniques. In such an example, given that the error tends to be quite small in comparison to accuracy of dip estimation techniques, persisting, saving, accessing, loading, etc., a positive dip field or a negative dip field for construction of a corresponding negative dip field or a corresponding positive dip field, such an approach may be considered substantially loss-less (e.g., in terms of the approach being akin to an approach for compression and decompression).

As an example, the difference data 750 may be available as an edge attribute, a chaos attribute, etc., as it can highlight one or more chaotic areas, large faults, etc. A graphical user interface, application configuration file, etc., may provide for options as to one or more attributes. For example, depending on a workflow or task, a user may select one or more options to determine one or more attributes. Such attributes may include attributes that output data such as the uncertainty data 730, the positive dip data 740 (e.g., or negative dip data), the difference data 750, etc. If a task is facilitated by edge detection, a user may select or configure a configuration file to provide difference data such as the difference data 750. Such a task may, for example, be a task where an edge attribute is input to a fault/fracture mapping workflow. Such a task may itself not leverage the benefits of "compact" storage in that, for example, a positive dip field and a negative dip field are available and another positive dip field is generated from the available negative dip field.

As an example, an isomorphic result may be performed on an input dip model, for example, to serve as an additional quality control check on the input dip model for a compression process or decompression process. For example, for an inline i, crossline j, and depth z, be calculated using an algorithm such as:

```
dIp = InlinePosDip [i,j,z];
dJp = CrosslinePosDip[i,j,z];
ErrI = Abs ( dIp – InlineNegativeDip[i+1,j,z+dIp] );
ErrX = Abs ( dJp – InlineNegativeDip[i,j+1,z+dJp] ); and
Err = Sqrt ( ErrI * ErrI + ErrJ * ErrJ ).
```

Accordingly, if one takes a step to the right in the input dip model, and then takes a step to the left, for the dips at those locations, one should be returned to the starting place. Such an algorithm can apply to inline and crossline directions. Such an approach may be referred to as a "2D dip inconsistency" attribute.

As to the RMS derivative data 760, this may be data for quality control, edge analysis, etc. As mentioned, an assumption for implementing an interpolation algorithm may be that estimated positive/negative dips in inline and crossline directions are relatively smooth vertically, with the meaning they are sufficiently low frequency that, for example, a linear interpolation scheme between samples may be appropriate. Such an assumption can be reasonable as layers in a sub-surface volume (e.g., outside one or more chaotic areas), tend to be reasonably parallel. The notion of layers being reasonably parallel stems from a theory for natural depositional processes for sediments.

As an example, data such as the RMS derivative data 760 may provide an indication as to areas within a sub-surface volume where an interpolation method may be beneficial (e.g., will produce reasonably reliable or useful output) and, for example, where it may fail to provide desired reliability. As an example, the RMS derivative data 760 may be considered an attribute generated by an attribute method that assess frequency content vertically, in a small time/depth window, above/below each sample, for each dip component output from a chosen dip estimation method. Such a method may be accomplished in one or more manners. For example, a method to analyze frequency content may include Fourier transform, statistical measurements (e.g., variance, entropy, etc.), etc.

In the example of FIG. 7, the RMS derivative data 760 stems from an attribute method that takes a vertical derivative of one or more dip components (inline/crossline, positive, negative components), and use an RMS value of the desired vertical derivatives, for example, as a measure of vertical smoothness. Such an attribute method may be considered a two-sample method, for example, to help ensure a maximum vertical resolution of a quality control field (e.g., as a quality control attribute). Specifically, the RMS derivative data 760 is the RMS of d/dt(negative inline dip) and d/dt(negative crossline dip).

As an example, the RMS derivative data 760 may be compared to the difference data 750. Such a comparison may notes some features that appear in both data 750 and data 760. Thus, as attributes, corresponding attribute methods may be implemented for complementary comparisons of output. As an example, the two attribute methods can provide two different measures to quantify the same underlying quality of estimated dip, for example, on a sample-by-sample basis. Such an approach may be used, for example, as a robust chaos indicator, fault indicator, chaos and fault indicator, etc. For example, a workflow may be defined to include one or more worksteps where one or more attribute methods are called upon to generate data such as the data 750, the data 760 or the data 750 and 760.

As to an attribute method that includes one or more derivatives, for example, to generate data such as the data 760, may be referred to as a "dip derivative" attribute. As mentioned, another attribute may be referred to as a "2D dip inconsistency" attribute and yet another attribute may be referred to as a "difference" attribute. As an example, such attributes may be optional and depend on desires of a user, for example, type of workflow, desired result, type of interpretation, etc. As mentioned, various attributes, while constructing a positive dip from negative dips or a negative dip from positive dips, may include accessing data sets that may not necessarily reduce data storage demands, data I/O demands, etc. However, as an example, after implementation of such an attribute method or attribute methods (e.g., quality control, edge detection, etc.), additional processing may occur where data storage demands, data I/O demands, etc., are reduced.

Figure 8:
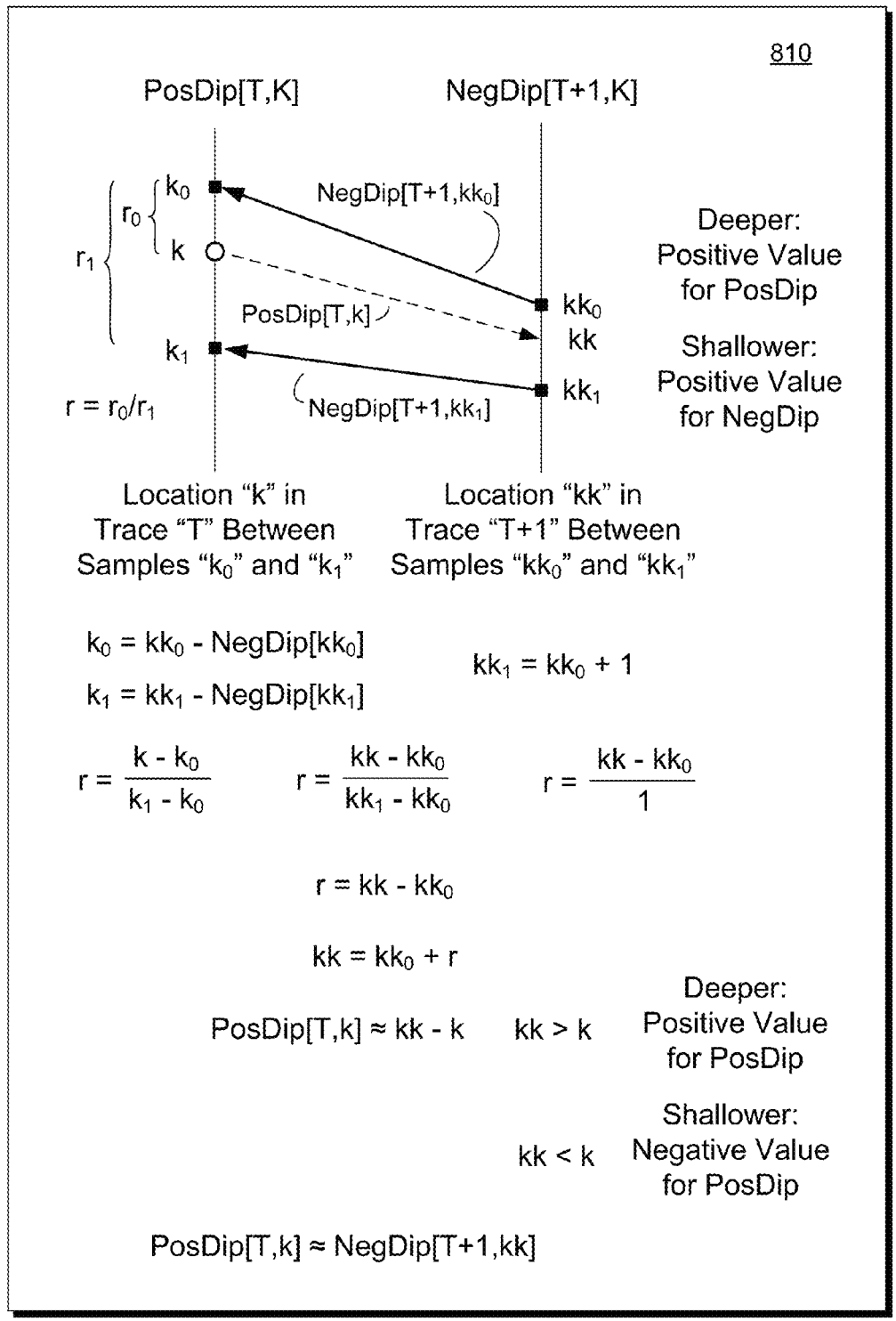
FIG. 8 illustrates an example of a method for deriving a positive dip seismic attribute from a negative seismic dip attribute.

FIG. 8 shows an example through a diagram and equations 810 where a positive dip can be approximated using a negative dip. The example of FIG. 8, various parameters are defined, some of which have been mentioned above. For example, a trace may be defined according to an inline, a crossline or other value "T" and a depth, time or sample value "K". As shown, a positive dip for a trace may be specified as PosDip[T,K] and a negative dip for an adjacent trace may be specified as NegDip[T+1,K]. As to sign conventions, a positive value for a positive dip may indicate that the dip is diving (e.g., moving deeper) between adjacent traces; whereas, a positive value for a negative dip may indicate that the dip is surfacing (e.g., moving shallower) between adjacent traces.

As shown in the example of FIG. 8, the trace at "T" includes a sample at $k_0$ and a sample at $k_1$, which may correspond to time or depth while the trace at "T+1" includes a sample at $kk_0$ and a sample at $kk_1$, which may correspond to time or depth. Given such definitions, the diagram and the equations 810 of FIG. 8 show that PosDip[T,k] can be approximated by NegDip[T+1,kk].

Figure 9:
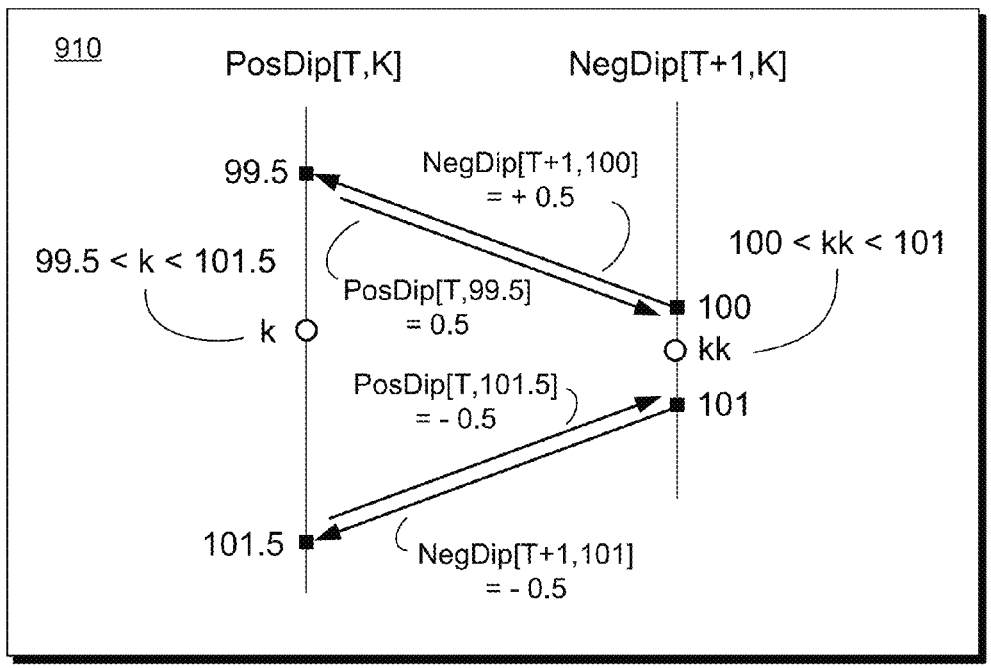
FIG. 9 illustrates an example of a method for deriving a positive dip seismic attribute from a negative seismic dip attribute.

FIG. 9 shows an example where numeric values applied to the diagram and equations 810 of FIG. 8. Specifically, FIG. 9 shows a diagram 910, equations 930 to determine a positive dip from negative dips (e.g., based on interpolation) and conditions 950. As an example, the equations 930, the conditions 950 or the equations and the conditions 950 may be implemented in a method such as the method 600 of FIG. 6. For example, the equations 930 may be implemented in the interpolation block 642 to calculate a positive dip based on negative dips. A corresponding equation to calculate a negative dip based on positive dips may be formulated and implemented in the interpolation block 662.

As shown in the equations 930, for the example data given, the PosDip[T,k]≈NegDip[T+1,101]*w[k]+NegDip[T+1,100]*(1−w[k]) where w[k]=(k−99.5)/(101.5−99.5). Such equations may be implemented in conjunction with conditions such as $kk_0$−NegDip[T+1,$kk_0$]<k where $kk_0$=100 and $kk_1$−NegDip[T+1,$kk_1$]>k where $kk_1$=101 (e.g., $kk_1$=$kk_0$+1). Such conditions may be applied, for example, in one or more decision blocks (see, e.g., the decision blocks 638 and 640 of FIG. 6; and, for negative dip, the decision block 658 and 660 of FIG. 6).

Thus, in the example of FIG. 9, one may assume that the unit of the dip is samples per trace, with floating point precision, and the polarity convention is that a positive value for a positive dip, means that the implicit layer/interface is moving deeper in the trace to the right. Given such an example, a positive value for a negative dip means that the implicit layer is to be found at a more shallow position in the trace to the left. For example, if negative dip for a position kk=100 (e.g., for sample #100 in trace #i) is equal to 0.5, then the positive dip for trace #i-1 at location 99.5 (e.g., 100-0.5) is also 0.5. Further, if negative dip for position kk=101 (e.g., for sample #100 in trace #i) is equal to -0.5, then the positive dip for trace #i-1 at location 101.5 (i.e. location #101-(-0.5)) is also -0.5. Given the foregoing numbers, assuming linearity between neighboring sample positions, since positive dip at position 99.5 is 0.5, and since the positive dip at position 101.5 is -0.5, then through interpolation, it is possible to calculate the positive dip for a position k, between in the interval between 99.5 and 101.5, for example, using the equation in equations 930: PosDip[k]=-0.5*w[k]+0.5*[1.0-w[k]] where: w[k]=(k-99.5)/(101.5-99.5).

To calculate the positive dip for a sample # k in trace # i-1, a method can include locating a sample position # $kk_0$ in trace # i as well as locating the sample position # $kk_1$ where $kk_1=kk_0+1$ in trace # i, such that $(kk_0-NegDip[kk_0] \le k)$ and $((kk_0+1)-NegDip[kk_0+1]>k)$ followed by interpolation (e.g., a linear or other interpolation).

As to the conditions 950, consider: $(kk_0+1)-NegDip[kk_0+1] \ge kk_0-NegDip[kk_0]$ or $kk_0$ such that $NegDip[kk_0+1]-NegDip[kk_0]<1$ (e.g., for each $kk_0$). In such an example, the conditions act to avoid having dips which would "cross" each other (e.g., which is not causal).

As an example, once a sample position $kk_0$, as outlined above, an algorithm such as described by the pseudo-code below may be implemented:

```
// Estimate positive dip, for position k, given kk0, through linear
interpolation float posDip = 0.0f;
if ( ( kk0 >= 0) && ( kk0 < (vc-1) ) ) // located valid sample location
{
    int    kk1 = kk0 + 1;
    float  k0 = kk0 - negDipArr[kk0];
    float  k1 = kk1 - negDipArr[kk1];
    if ( k1 != k0 )
    {
        float   r = (k-k0) / (k1-k0);
        float   kk = kk0 + r;
        posDip = kk - k; // positive dip for sample # k
    }
}
return posDip;
```

Figure 10:
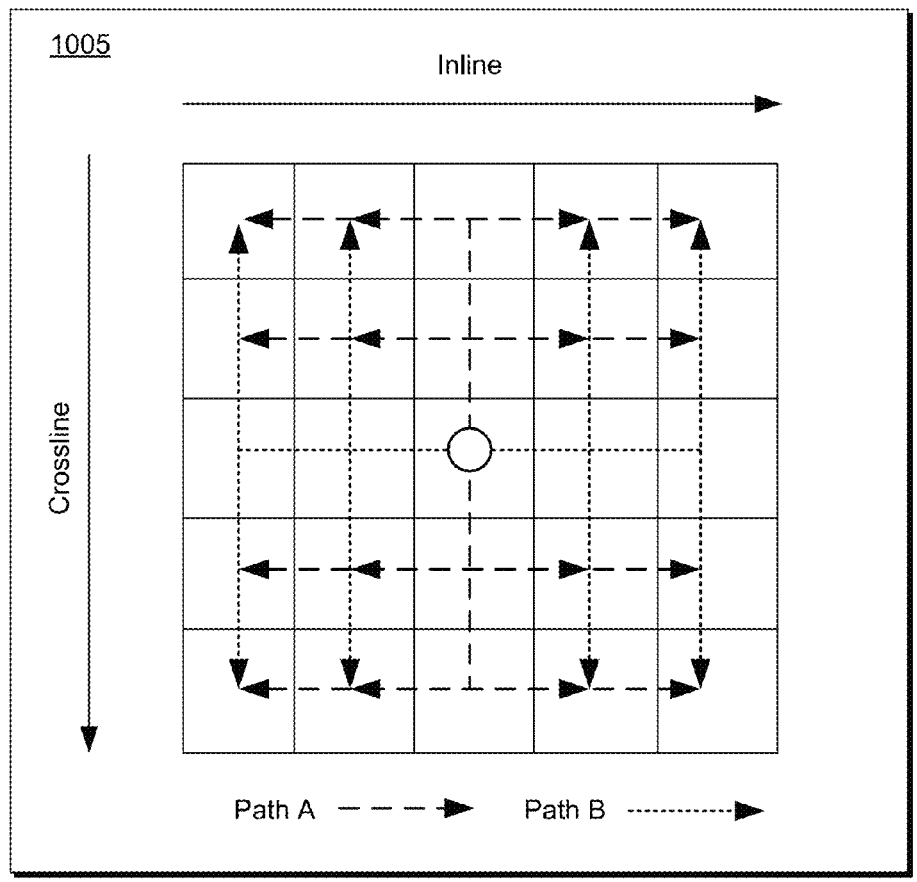
FIG. 10 illustrates an example of a method for deriving a dip seismic attribute.
Figure 10:
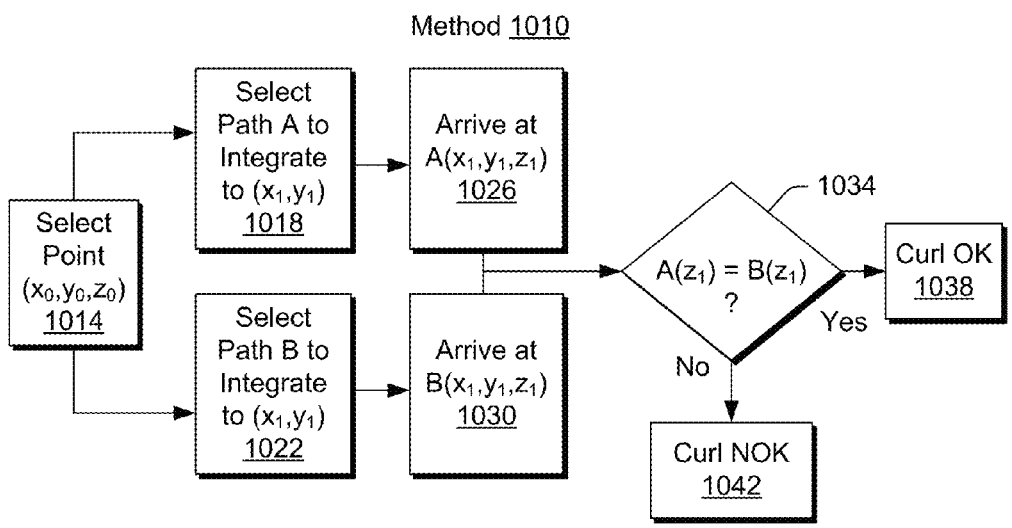

FIG. 10 shows an example of a diagram 1005 and an example of a method 1010 for quality control. As mentioned, a quality dip field may be assessed as to whether or not "path independence" is invariant. For example, if one starts at a point $(x_0,y_0,z_0)$ in a dip model, and integrates up the dip values to another spatial location $(x_1,y_1)$, then the end point will be at the same time/depth point $z_1$ (e.g., regardless of path taken from $(x_0,y_0)$ to $(x_1,y_1)$. As mentioned, in mathematical terms for this is characteristic, "curl" of a vector dip model will be equal to or tend to zero (e.g., within some reasonable error) within a dip model. As an example, an assumption may be made that path invariance is honored for estimated positive/negative inline and crossline dip fields coming out of a dip estimation process. As an example, path invariance may be honored for constructed or reconstructed dip fields. As an example, a quality control attribute or metric may be derived using a method such as the method 1010 of FIG. 10, which may help in validating that path invariance exists, for example, for one or more construction (e.g., or reconstruction) process (e.g., as in the method 600 of FIG. 6).

In the example of FIG. 10, the diagram 1005 shows a sample in a dip model (open circle) where a method such as the method 1010 can calculate a two-way time/depth difference from the origin of the sample to any of its neighboring locations, following two different paths. In the diagram 1005, a Path A starts out in the inline direction (dashed lines) and a Path B starts out in the crossline direction (dotted lines). For each visited point, a method can include calculating the "altitude" difference from the two paths, and taking the maximum altitude difference, from its visited neighbors, to be the reconstruction uncertainty measurement for the starting point.

As an example, such a method may include starting at a given depth $z_0$, and then summing up altitude difference for each step, where (e.g., assuming the dip is stored as altitude difference per trace) when taking one step to the right, the method includes adding the positive crossline dip the for the current position and when taking one step to the left, the method includes subtracting of negative crossline dip for that location (e.g., by implication). In such a method, a step up can imply subtracting of the negative inline dip and a step down can imply adding of the positive inline dip for a current location.

In the example of FIG. 10, the diagram 1010 shows paths followed from a selected sample to validate path independence (e.g., path invariance), for a search radius (e.g., blockwise) of two traces, in both inline and crossline direction. As an example, a search radius may be defined as a parameter for a construction or reconstruction uncertainty process (e.g., an uncertainty attribute method). Thus, as shown in FIG. 10, a path independence/curl concept can be implemented as a measure of quality.

As an example, a method can include integrating a dip field in a circle (e.g., or square) pattern (e.g., with a default or user-specified radius), around each location in an effort to determine whether one would end up at the same altitude/depth as a start location.

As an example, a method can include calculating a path invariance (e.g., "curl" attribute) for a full dip model. In such an example, a dip model may be provided its estimated positive and negative dips, and inline and crossline directions, where a curl attribute method is applied to quantify how well the dip model estimation process honors path independence (e.g., path invariance).

As to the method 1010, it includes a selection block 1014 for selecting a starting point, a selection block 1018 for selecting Path A, a selection block 1022 for selecting Path B, an arrival block 1026 for arriving at a point via Path A, an arrival block 1030 for arriving at a point via Path B, and a decision block 1034 for deciding if the altitude of the arrival points for Path A and Path B are the same (e.g., within some error tolerance). Based on the decision block 1034, the method 1010 decides whether to continue at a block 1038 indicating that curl is OK (path invariance) or to continue at a block 1042 indicating that curl is not OK (lack of path invariance). As an example, a difference block may be provided that calculates a difference or differences for Path A and Path B (e.g., as to altitude) and that stores, displays, etc., the difference (e.g., as a quality control or other metric).

Figure 11:
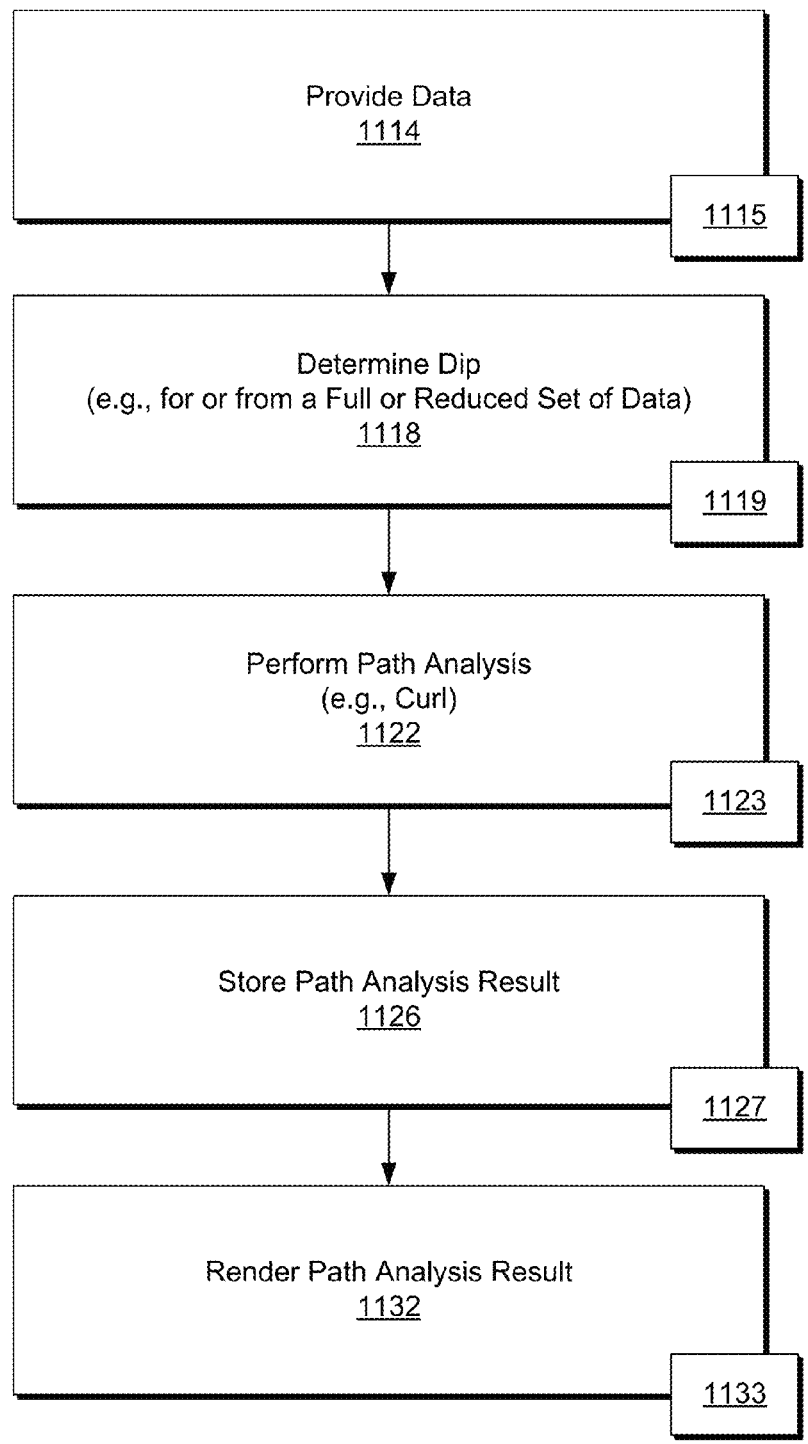
FIG. 11 illustrates an example of a method for deriving a dip seismic attribute.

FIG. 11 shows an example of a method 1110 for rendering a result from a path analysis. The method 1110 includes a provision block 1114 for providing data, a determination block 1118 for determining dip for or from a full or a reduced set of data, a performance block 1122 for performing path analysis (e.g., curl checking), a storage block 1126 for storing results of the path analysis and a render block 1132 for rendering path analysis results to a screen, a display, etc. As to the determination block 1118, it may determine dips from seismic data (e.g., using a technique such as the technique of FIG. 4) to provide a full or a reduced set of dip data, it may determine dips from a full set of dip data using interpolation, it may determine dips from a reduced set of dip data using interpolation, etc. As to the performance block 1122 for performing path analysis, such an analysis may include one or more parameters, optionally selectable by a user. For example, a radius parameter may be used for paths and, for example, results may be generated for a plurality of radii and compared (e.g., to determine if path invariance occurs over a region, a scale, etc.).

Figure 12:
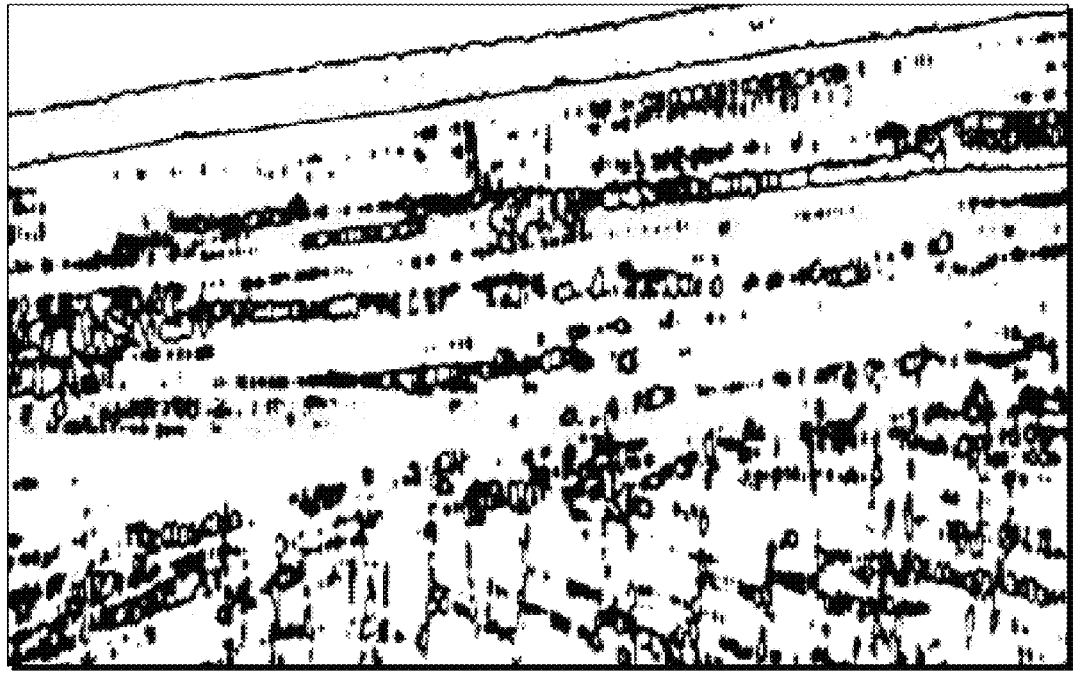
FIG. 12 illustrates an example of a dip seismic attribute.

FIG. 12 shows an example of path attribute data 1210. Such data may be data output from a path-independence (e.g., curl) quality control attribute, for example, as explained above, for example for a selected radius (e.g., for a radius of 1). In the example of FIG. 12, the data 1210 tends to be relatively consistent with other quality control or edge detection attributes described above. Such an attribute may be implemented, for example, in a workflow, a workstep, etc., where chaos, discontinuities, etc. are of interest. As an example, the path attribute represented by the path attribute data 1210 may be referred to as a "3D dip inconsistency" attribute.

As an example, one or more dip quality control, edge detection, etc., attributes may be run either on an input dip model, on a reconstructed dip model (e.g., construction of one type of dip from another type of dip), etc. As mentioned, a dip attribute may include a 2D dip inconsistency attribute, a 3D dip inconsistency attribute, a dip derivative attribute, or other type of attribute described herein.

Figure 13:
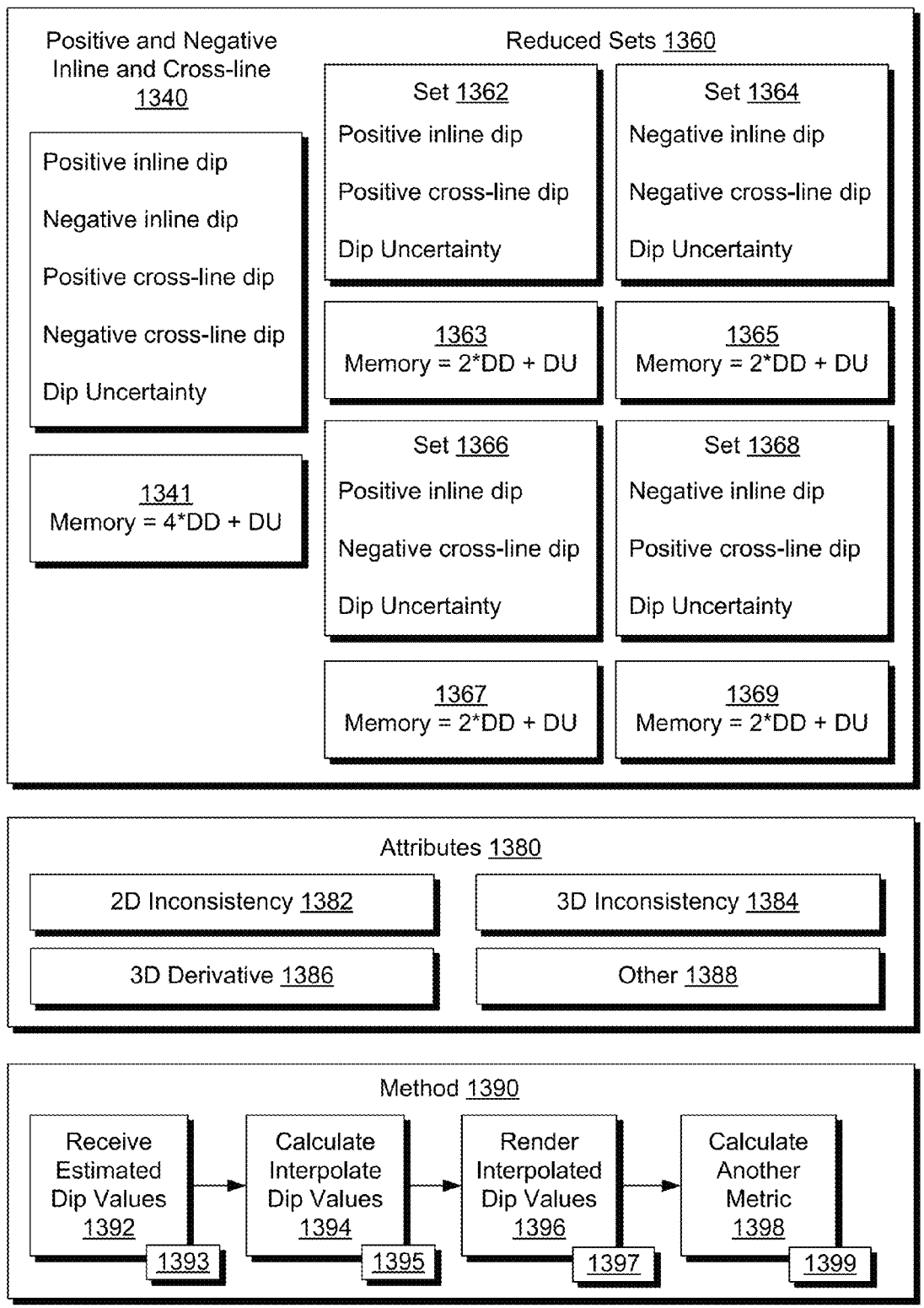
FIG. 13 illustrates examples of full and reduced data sets for dip seismic attributes, examples of attributes and an example of a method.

FIG. 13 shows examples of data sets 1340 and 1360, examples of attributes, which may optionally be implemented with one or more of the data sets 1340 and 1360, or optionally seismic data, and an example of a method 1390. The data sets 1360 include sets 1362, 1364, 1366 and 1368 as well as memory block 1363, 1365, 1367 and 1369, which indicate examples of memory demand for corresponding data sets. As indicated, a memory block 1341 for the "full" data set 1340 has a greater memory demand than for the reduced sets 1360.

As to the attributes 1380, these can include a 2D inconsistency attribute 1382, a 3D inconsistency attribute 1384, a 3D derivative attribute 1386 and one or more other attributes 1388. The attributes 1380 can include corresponding methods for calculation of such attributes, for example, from one or more of the data sets 1340 and 1360. In the example of FIG. 13, the attributes 1380 may be provided as modules, for example, instructions in one or more computer-readable media for implementation using one or more processors configured to execute the instructions.

As to the method 1390, it includes a reception block 1392 for receiving estimated dip values, a calculation block 1394 for calculating interpolated dip values, a render block 1396 for rendering interpolated dip values to a display and a calculation block 1398 for calculating another metric, which may be rendered to a display (e.g., as part of an analysis, workflow, etc.).

The method 1390 is shown in FIG. 13 in association with various computer-readable media (CRM) blocks 1393, 1395, 1397 and 1399. Such blocks can include instructions suitable for execution by one or more processors (or processing cores) to instruct a computing device or system to perform one or more actions. Though various blocks are shown, a single medium may be configured with instructions to allow for, at least in part, performance of various actions of the method 1390. As an example, a computer-readable medium (CRM) may be a computer-readable storage medium. As an example, the memory 258 of FIG. 2 may provide for storage of instructions executable by one or more of the one or more processors 256 of FIG. 2. Thus, the memory 258 may be a CRM as in FIG. 13.

As an example, one or more computer-readable storage media can include computer-executable instructions to instruct a computing system to: receive estimated positive structural dip values or estimated negative structural dip values determined using volumetric seismic data and a structural dip estimation technique; for reception of estimated positive structural dip values, calculate interpolated negative dip values based on the estimated positive structural dip values or, for reception of estimated negative structural dip values, calculate interpolated positive dip values based on the estimated negative structural dip values; and render the interpolated negative dip values or the interpolated positive dip values to a display.

As an example, one or more computer-readable storage media can include computer-executable instructions to instruct a computing system to: calculate curl values for a dip field defined by interpolated negative dip values or interpolated positive dip values; and render the curl values to the display.

As an example, one or more computer-readable storage media can include computer-executable instructions to instruct a computing system to: receive estimated positive structural dip values and estimated negative structural dip values determined using volumetric seismic data and a structural dip estimation technique (e.g. Taylor series expansion, etc.); calculate interpolated positive dip values based on the estimated negative structural dip values; calculate interpolated negative dip values based on the estimated positive structural dip values; calculate positive dip difference values between the interpolated positive dip values and the received positive dip values; calculate negative difference values between the interpolated negative dip values and the received negative dip values; and render to the display the positive dip difference values, the negative dip difference values or the positive dip difference values and the negative dip difference values.

Figure 14:
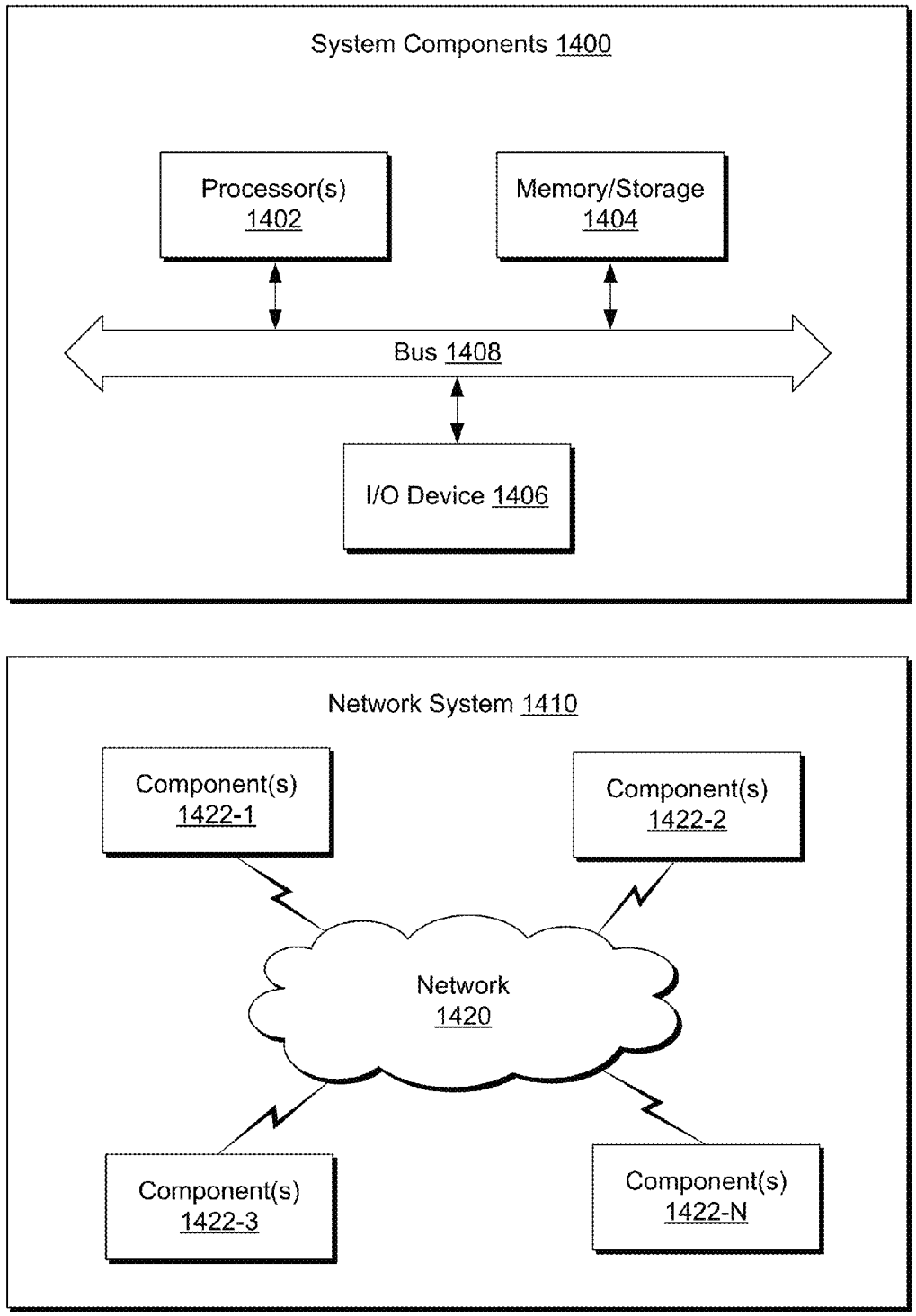
FIG. 14 illustrates example components of a system and a networked system.

FIG. 14 shows components of an example of a computing system 1400 and an example of a networked system 1410. The system 1400 includes one or more processors 1402, memory and/or storage components 1404, one or more input and/or output devices 1406 and a bus 1408. In an example embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1402-2 may include an I/O device for display and optionally interaction with a method. The network may be or include the Internet, an intranet, a cellular network, a satellite network, etc.

Although a few example embodiments have been described in detail above, those skilled in the art will readily appreciate that many modifications are possible in the example embodiments without materially departing from the embodiments of the present disclosure. Accordingly, such modifications are intended to be included within the scope of this disclosure as defined in the following claims. In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A method comprising:
receiving a request for a positive dip value or a negative dip value for a location within a geologic environment;
responsive to the request for a positive dip value or a negative dip value, accessing a data storage device for negative dip values or positive dip values, respectively, for locations within the geologic environment wherein the location for the requested dip value lies within bounds defined by the locations for the accessed dip values;
interpolating a value for the requested dip value based on the accessed dip values; and
rendering information to a display, based at least in part on the interpolated value, for interpretation of structure within the geologic environment.

2. The method of claim 1 wherein the receiving receives a request for a positive dip value and wherein the accessing accesses negative dip values.

3. The method of claim 1 wherein the receiving receives a request for a negative dip value and wherein the accessing accesses positive dip values.

4. The method of claim 1 wherein the accessing comprises accessing a data set that comprises negative inline dip values, negative crossline dip values and uncertainty values for the geologic environment.

5. The method of claim 1 wherein the accessing comprises accessing a data set that comprises positive inline dip values, positive crossline dip values and uncertainty values for the geologic environment.

6. The method of claim 1 comprising performing a path analysis for the location of the requested dip value using at least two paths within the geologic environment.

7. The method of claim 6 wherein the path analysis determines if path invariance exists for the location of the requested dip value based on curl of a dip field.

8. The method of claim 1 comprising repeating the method for one or more additional requests for dip values for different locations within the geologic environment.

9. The method of claim 1 comprising providing a dip model derived from seismic data using a Taylor series expansion technique.

10. A system comprising:
one or more processors;
memory; and
instructions stored in the memory and executable by at least one of the one or more processors to instruct the system to
responsive to a request for a dip value for a location within a sub-surface volume, access via a storage device complementary dip values for locations within the sub-surface volume wherein the location for the requested dip value lies within bounds defined by the locations for the complementary dips values, wherein, for a request for a positive dip value, the complementary dip values are negative dip values, and wherein, for a request for a negative dip value, the complementary dip values are positive dip values, and interpolate a value for the requested dip value based on the complementary dip values.

11. The system of claim 10 comprising instructions stored in the memory and executable by at least one of the one or more processors to instruct the system to:
calculate path attribute values for locations within the sub-surface volume wherein the path attribute values represent curl of a dip field within the sub-surface volume.

12. The system of claim 10 comprising instructions stored in the memory and executable by at least one of the one or more processors to instruct the system to:
compare the interpolated value for the requested dip value to a dip value determined based on seismic data and a Taylor series expansion.

13. The system of claim 10 comprising instructions stored in the memory and executable by at least one of the one or more processors to instruct the system to:
calculate difference attribute values based on differences between interpolated values and dip values determined based on seismic data and a Taylor series expansion.

14. The system of claim 10 comprising instructions stored in the memory and executable by at least one of the one or more processors to instruct the system to:
access a data set, stored by the storage device, that comprises at least positive dip values or at least negative dip values for the sub-surface volume.

15. The system of claim 10 comprising instructions stored in the memory and executable by at least one of the one or more processors to instruct the system to:
calculate derivative attribute values for a dip field within the sub-surface volume wherein the derivative attribute values represent vertical smoothness of the dip field.

16. The system of claim 10 comprising instructions stored in the memory and executable by at least one of the one or more processors to instruct the system to:
calculate a quality control attribute based at least in part on interpolated dip values wherein the quality control attribute indicates quality of regional dip field values for calculating interpolated dip values.

17. The system of claim 16 wherein the quality control attribute that indicates quality of regional dip field values for calculating interpolated dip values indicates regional chaos.

18. One or more computer-readable non-transitory storage media comprising computer-executable instructions to instruct a computing system to:
receive estimated positive structural dip values or estimated negative structural dip values determined using volumetric seismic data and a structural dip estimation technique;
for reception of estimated positive structural dip values, calculate interpolated negative dip values based on the estimated positive structural dip values or, for reception of estimated negative structural dip values, calculate interpolated positive dip values based on the estimated negative structural dip values; and
render the interpolated negative dip values or the interpolated positive dip values to a display.

19. The one or more computer-readable non-transitory storage media of claim 18 comprising computer-executable instructions to instruct a computing system to:

calculate curl values for a dip field defined by the interpolated negative dip values or the interpolated positive dip values; and render the curl values to the display.

20. The one or more computer-readable non-transitory storage media of claim 18 comprising computer-executable instructions to instruct a computing system to:

receive estimated positive structural dip values and estimated negative structural dip values determined using volumetric seismic data and a structural dip estimation technique;

calculate interpolated positive dip values based on the estimated negative structural dip values;

calculate interpolated negative dip values based on the estimated positive structural dip values;

calculate positive dip difference values between the interpolated positive dip values and the received positive dip values;

calculate negative difference values between the interpolated negative dip values and the received negative dip values; and render to the display the positive dip difference values, the negative dip difference values or the positive dip difference values and the negative dip difference values.

* * * * *